US012183163B2

(12) United States Patent
Moore et al.

(10) Patent No.: US 12,183,163 B2
(45) Date of Patent: Dec. 31, 2024

(54) SYSTEMS AND METHODS FOR COMBINED ONLINE AND IN-CASINO WAGERING GAME TOURNAMENTS

(71) Applicant: Walker Digital Table Systems, LLC, Las Vegas, NV (US)

(72) Inventors: Stephen Moore, Las Vegas, NV (US); Todd Wingate, Las Vegas, NV (US); Carolyn Moore, Las Vegas, NV (US)

(73) Assignee: Walker Digital Table Systems, LLC, Las Vegas, NV (US)

(*) Notice: Subject to any disclaimer, the term of this patent is extended or adjusted under 35 U.S.C. 154(b) by 187 days.

(21) Appl. No.: 17/701,955

(22) Filed: Mar. 23, 2022

(65) Prior Publication Data

US 2022/0215722 A1 Jul. 7, 2022

Related U.S. Application Data

(63) Continuation of application No. PCT/US2020/052403, filed on Sep. 24, 2020.

(60) Provisional application No. 62/905,278, filed on Sep. 24, 2019.

(51) Int. Cl.
*G07F 17/32* (2006.01)
*G06Q 50/34* (2012.01)

(52) U.S. Cl.
CPC ......... *G07F 17/3276* (2013.01); *G06Q 50/34* (2013.01); *G07F 17/322* (2013.01); *G07F 17/3251* (2013.01); *G07F 17/3288* (2013.01)

(58) Field of Classification Search
None
See application file for complete search history.

(56) References Cited

U.S. PATENT DOCUMENTS

| | | | |
|---|---|---|---|
| 8,317,601 | B1 | 11/2012 | Luciano |
| 8,485,890 | B2 | 7/2013 | Gagner et al. |
| 8,517,810 | B2 | 8/2013 | Vann |
| 8,529,338 | B2 | 9/2013 | Allen et al. |
| 8,550,920 | B1 | 10/2013 | Allen et al. |
| 9,039,410 | B2 | 5/2015 | Walker et al. |
| 9,129,489 | B2 | 9/2015 | Froy et al. |
| 9,378,613 | B2 | 6/2016 | Allen et al. |
| 9,530,150 | B2 | 12/2016 | Goldberg et al. |

(Continued)

FOREIGN PATENT DOCUMENTS

WO 2017146565 8/2017

OTHER PUBLICATIONS

International Search Report for PCT/US20/52403 dated Dec. 10, 2020. 2 pps.

(Continued)

*Primary Examiner* — Jason T Yen
(74) *Attorney, Agent, or Firm* — Rowan Tree Law Group, PLLC; Magdalena M. Fincham

(57) ABSTRACT

Systems and methods for combined or hybrid online and in-casino wagering game tournaments are provided. Combined online and in-casino tournaments may permit both online and in-casino players at non-dedicated machines to participate in the same tournament asynchronously. Hybrid online and in-casino tournaments may permit a single player to utilize both online and in-casino gaming sessions conducted at non-dedicated machines to participate in the same tournament asynchronously.

20 Claims, 11 Drawing Sheets

(56) References Cited

U.S. PATENT DOCUMENTS

| | | | |
|---|---|---|---|
| 9,592,444 B2 | 3/2017 | Knutsson et al. | |
| 9,704,343 B2 | 7/2017 | Anderson et al. | |
| 9,767,643 B2 | 9/2017 | Milternberger et al. | |
| 9,773,376 B2 | 9/2017 | Rajput et al. | |
| 9,818,261 B2 | 11/2017 | Pacey | |
| 9,881,444 B2 | 1/2018 | Nelson et al. | |
| 10,121,312 B2 | 11/2018 | Allen et al. | |
| 10,163,304 B1 | 12/2018 | Pascal et al. | |
| 10,217,317 B2 | 2/2019 | Nelson et al. | |
| 2001/0016519 A1 | 8/2001 | Choe | |
| 2007/0173318 A1* | 7/2007 | Abbott | G07F 17/3276 463/25 |
| 2011/0143834 A1 | 6/2011 | Guinn et al. | |
| 2011/0294561 A1 | 12/2011 | Shaw et al. | |
| 2014/0094256 A1 | 4/2014 | Hilbert et al. | |
| 2014/0323199 A1* | 10/2014 | DiMichele | G07F 17/323 463/20 |
| 2014/0364190 A1* | 12/2014 | DiMichele | G07F 17/323 463/20 |
| 2014/0364199 A1 | 12/2014 | Baerlocher et al. | |
| 2015/0199878 A1* | 7/2015 | Wright | G07F 17/3276 463/25 |
| 2016/0071373 A1 | 3/2016 | Anderson et al. | |
| 2016/0093166 A1 | 3/2016 | Panambur et al. | |
| 2017/0006322 A1 | 1/2017 | Dury et al. | |
| 2017/0106290 A1* | 4/2017 | Pierce | A63F 13/792 |
| 2018/0025583 A1 | 1/2018 | Haag | |
| 2019/0139363 A1 | 5/2019 | deWaal | |

OTHER PUBLICATIONS

Written Opinion for PCT/US20/52403 dated Dec. 10, 2020. 7 pps.

Darren Heitner, "The Battle of Online vs. Land-Based Casinos," Aug. 7, 2014, website: https://www.forbes.com/sites/darrenheitner/2014/08/07/the-battle-of-online-vs-land-based-casinos/#3f552a9e2ebc; 6 pps.

Abarbanel et al., "eCommerce Market Convergence in Action: Social Casinos and Real Money Gambling," UNLV Gaming Research & Review Journal vol. 19 Issue 1, 2015, website: https://digitalscholarship.unlv.edu/cgi/viewcontent.cgi?referer=https://scholar.google.com/&httpsredir=1&article=1319&context=grrj; 12 pps.

* cited by examiner

SYSTEMS AND METHODS FOR COMBINED ONLINE AND IN-CASINO WAGERING GAME TOURNAMENTS

CLAIM OF PRIORITY

This application is a Continuation Application, under 35 U.S.C. § 111(a), of PCT Application No. PCT/US20/52403 filed on Sep. 24, 2020 in the name of Moore et al. and titled SYSTEMS AND METHODS FOR COMBINED ONLINE AND IN-CASINO WAGERING GAME TOURNAMENTS, which PCT Application claims benefit and priority under 35 U.S.C. § 119(e) to, and is a Non-Provisional of, U.S. Provisional Patent Application No. 62/905,278 filed on Sep. 24, 2019 and titled "SYSTEMS FOR ENABLING PARTICIPATION IN WAGERING GAME TOURNAMENTS FROM BOTH ONLINE AND IN PHYSICAL CASINO LOCATIONS." The entirety of each of the foregoing applications is hereby incorporated by reference for all purposes.

BACKGROUND

Wagering game tournaments, whether for table games such as poker or baccarat or for slot machine games, are a popular pastime and lucrative revenue source for brick and mortar casinos. Such tournaments, however, may take a long time to complete. Some players may avoid becoming involved with a wagering game tournament if they are not certain that they will be able to remain present at the casino hosting the tournament for the entire duration of the tournament. This results in lost revenue for casinos. Further, concerns about maintaining a tournament of reasonable length cause casinos to limit or avoid certain options for tournaments (e.g., number of players, complexity of rules), some of which options might otherwise make a tournament more enjoyable for players, provide more or larger prizes and/or more revenue for the casino. Accordingly, a need exists for a solution that alleviates some of these concerns regarding lengthy wagering game tournaments that are initiated at a brick and mortar casino, while maintaining some of the benefits a brick and mortar casino obtains from having players physically present in its establishment (e.g., players purchasing items from gift stores or food venues, staying at a corresponding hotel, seeing shows at venues affiliated with the brick and mortar casino or engaging in additional wagering activities at the brick and mortar casino).

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Terms & Definitions

Figure 1:
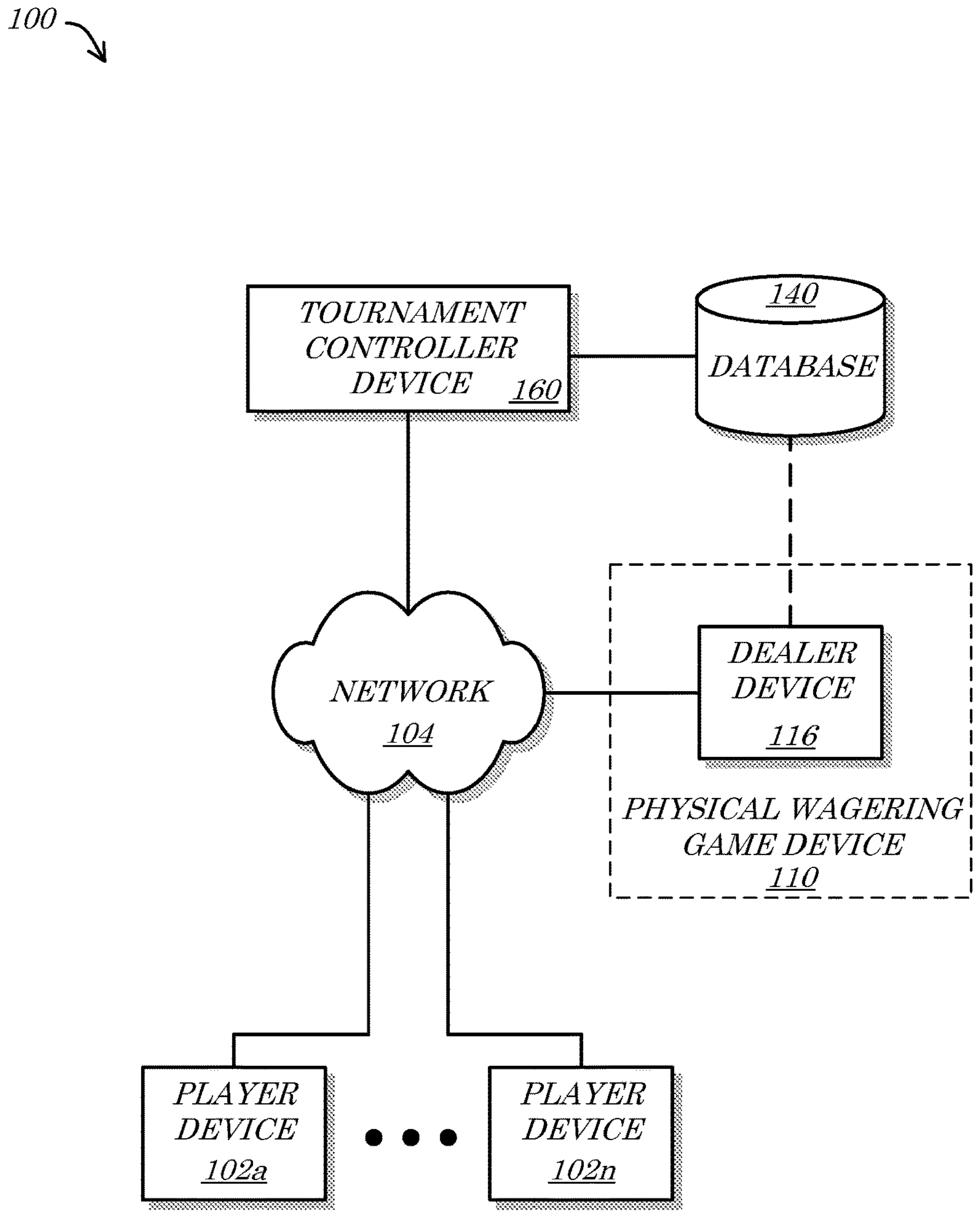
FIG. 1 is a block diagram of a system according to some embodiments.

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The terms "indication" and "representation", as used herein unless specified otherwise, may refer to any indicia and/or other information indicative of or associated with a subject, item, entity, and/or other object and/or idea. As used herein, the phrases "information indicative of", "representation of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "network component," as used herein unless specified otherwise, may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet Local Area Network (LAN) transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

The term "player," as used herein unless specified otherwise, may refer to any type, quantity, and or manner of entity associated with the play of a game. In some embodiments, a player may comprise an entity who (i) has initiated participation in a wagering game tournament while physically present in a brick and mortar casino; (ii) proceeded to participate in the wagering game tournament online, from a player device such as a mobile device; (iii) won at least one prize as a result of playing in the wagering game tournament; and (iv) desires to redeem the prize(s) by again visiting the brick and mortar casino. A player may (i) be currently playing in a game or tournament; (ii) have previously played the game or tournament; or (iii) have not yet have initiated play—i.e., a "player" may comprise a "potential player" (e.g., in general and/or with respect to a specific wagering game tournament). In some embodiments, a player may comprise a user of a Graphical User Interface (GUI) for facilitating a wagering game tournament (e.g., whether or not such a player participates in a tournament or seeks to participate in the tournament).

Some embodiments described herein are associated with a "player device", "user device", "gaming device" or a "network device". As used herein, any of these devices are to be considered a respective subset of a "network device". The "network device", for example, may generally refer to any device that can communicate via a network, while a "mobile user device" may comprise a network device that is owned and/or operated by or otherwise associated with a user such as a player. Examples of network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Network devices may, in some embodiments, comprise one or more network components.

In some embodiments a user device may comprise a dedicated gaming device such as a gaming device that is the property of a brick and mortar casino or leased by a brick and mortar casino (e.g., a slot machine, a video poker machine or an electronic table game) the primary purpose of which is to facilitate wagering games on behalf of the brick and mortar casino. Such dedicated user devices are referred to as Electronic Gaming Machine (EGM) devices herein. In other embodiments a user device may comprise a non-dedicated user device such as a users mobile device (e.g., smart phone or tablet computer) that has many purposes, is the property of the user rather than the property of the brick and mortar casino and that, while it can facilitate online gaming, is utilized by the user for many other purposes. Such non-dedicated user devices are referred to as mobile devices herein (although they do not necessarily have to be mobile (e.g., they can be desktop computers)). In some embodiments a casino may provide to a user a tablet or other mobile device for purposes of facilitating wagering games as well as providing other non-gaming services (e.g., ordering drinks or food from an establishment affiliated with the casino, checking on room reservations at a hotel affiliated with the casino, accessing a financial account, etc.). Such a mobile device may be referred to as a casino mobile device and is yet another example of a user device that may be useful in implementing some embodiments described herein.

A "tournament" or "tourney" as the terms are used herein unless specified otherwise, refer to a wagering game event in which a plurality of players participate and compete against one another (or compete against the gaming establishment or AI opponent) for one or more prizes, the event spanning a plurality of hands, sessions, and/or game plays of one or more wagering games (e.g., a plurality of hands of baccarat if it is a baccarat game tournament). In accordance with some embodiments, a tournament is defined by a start time and an end time, and one or more winners are determined once the results for all hands or game plays played between the start time and the end time are received by the system. In some embodiments, both the start time and the end time may be defined by means of a particular time and date (e.g., the tournament starts on Monday, Jul. 1, 2019 at 8 AM and ends on Monday, Jul. 8, 2019 at midnight). In other embodiments, at least one of the start time and the end time of a tournament may be defined in terms of a maximum or minimum number of hands or rounds of play and may thus be different for different players registered for the tournament. For example, players registered for the tournament are to play two hundred (200) hands of baccarat, either online or offline, and the tournament for each player starts when they play their first hand after registering for the tournament and ends when they play the last of the two hundred (200) hands, although a maximum amount of time or end time may be specified (e.g., there can be no more than seven (7) days between the first hand and the last hand or the last hand has to be completed by midnight on a certain date in order to count towards the tournament). In some embodiments, a "combined" tournament may be descriptive of a tournament that includes participants playing both online and in-casino games and/or a "hybrid" tournament may be descriptive of a tournament in which a particular player utilizes both online and in-casino game play to participate in the tournament.

A "user" as the term is used herein unless specified otherwise, refers to a person engaged in an online activity via which the person may win prizes redeemable at a physical, or "brick and mortar", establishment. In embodiments involving games (e.g., wagering games), a user may be referred to as a "player." Accordingly, a "player" may be considered a species of a "user."

Numerous embodiments are described in this patent application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s)

may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

II. Introduction

Applicants have recognized that as online wagering gains in popularity and acceptance, brick and mortar casinos can benefit from this trend by allowing players who enter a wagering game tournament at the brick and mortar casino location (e.g., "in-casino") to continue the wagering game tournament online (e.g., at the players' discretion, if a particular player needs to leave the brick and mortar casino prior to an end of the tournament, or as part of a routine rule of the tournament for all participating players). This would provide more flexibility to players who might not otherwise enter a tournament at the brick and mortar casino (e.g., due to worries that they cannot stay at the brick and mortar casino for the entire duration of the tournament). This may also allow casinos to provide more complex or lengthy features to the tournament (which may, in some instances, allow for larger and/or more frequent prizes) without worrying about alienating potential players who may not be able to remain present at the brick and mortar casino for the entire duration of the tournament. In order to alleviate potential concerns brick and mortar casinos may have regarding allowing wagering game tournaments to be partially played online (e.g., that this would cause a decrease in revenue to the casino because players who are not physically present at the brick and mortar casino will not spend additional money at the casino), in some embodiments players who win prizes as a result of a tournament that is partially played online may be required to present themselves at the brick and mortar casino in order to collect or redeem the prize(s).

Applicant has further recognized that because some brick and mortar casinos have established or may establish an online presence, or have partnered with established third party online casinos, allowing players who enter a tournament at a brick and mortar casino to at least partially compete in the tournament online (e.g., from a remote location using their mobile device) would allow the brick and mortar casinos to take advantage of their online capabilities to provide more flexible options to the players visiting their brick and mortar establishment(s).

In order to help minimize negative impact on the potential revenue a brick and mortar casino may be concerned about in allowing its players to play at least partly online when participating in a tournament, Applicant provides herewith various methods and systems for allowing players who play a part of a wagering game tournament online to redeem any prizes won as a result of such tournaments at the brick and mortar casino at which the tournament was initiated (e.g., via an app residing on the user's mobile device and a redemption device located within the brick and mortar casino).

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and it is possible that no single feature is solely responsible for its desirable attributes or is essential to practicing the inventions herein described.

III. Online and In-Casino Wagering Game Tournament Systems

Referring first to FIG. 1, a block diagram of a system 100 according to some embodiments is shown. In some embodiments, the system 100 may comprise a plurality of player devices 102*a-n* (each operated by one or more users or players; not shown in FIG. 1), a network 104, a physical wagering game device 110, a dealer device 116, a database 140, and/or a tournament controller device 160. As depicted in FIG. 1, any or all of the devices 102*a-n*, 110, 116,140, 160 (or any combinations thereof) may be in communication via the network 104. In some embodiments, the system 100 may be utilized enable a player (not shown) to participate in the same tournament utilizing both online/remote and in-casino means and/or to enable both online and in-casino players to participate in the same wagering game tournament. The tournament controller device 160 may, for example, interface with the physical wagering game device 110, which in turn interfaces with one or more of the player devices 102*a-n* to conduct a physical or hybrid physical and online wagering game (e.g., in a casino; not shown). According to some embodiments, the tournament controller device 160 may interface with one or more of the player devices 102*a-n* to conduct one or more online wagering games (e.g., distinct from a wagering game conducted by or at the physical wagering game device 110).

Fewer or more components 102*a-n*, 104, 110, 116,140, 160 and/or various configurations of the depicted components 102*a-n*, 104, 110, 116,140, 160 may be included in the system 100 without deviating from the scope of embodiments described herein. In some embodiments, the components 102*a-n*, 104, 110, 116,140, 160 may be similar in configuration and/or functionality to similarly named and/or numbered components as described herein. In some embodiments, the system 100 (and/or portion thereof) may comprise a combined online and in-casino wagering game tournament program, system, and/or platform programmed and/or otherwise configured to execute, conduct, and/or facilitate the methods 600, 700 of FIG. 6 and/or FIG. 7 herein, and/or portions or combinations thereof.

The player devices 102*a-n*, in some embodiments, may comprise any types or configurations of computing, mobile electronic, network, user, and/or communication devices that are or become known or practicable. The player devices 102*a-n* may, for example, comprise one or more tablet computers, such as an iPad® manufactured by Apple®, Inc. of Cupertino, CA, programming workstations, such as the Titan® C200™ compact AMD® RYZEN® 9 Workstation PC (manufactured by Titan® Computers of Hallandale Beach, FL), and/or cellular and/or wireless telephones or "smart" phones, such as an iPhone® 11 (also manufactured by Apple®, Inc.) or an Optimus™ L90™ smart phone manufactured by LG® Electronics, Inc. of San Diego, CA, and running the Android® operating system from Google®, Inc. of Mountain View, CA, or a Galaxy® Note20™ 5G (manufactured by Samsung® Electronics Co., Ltd. of Suwon, South Korea). In some embodiments, one or more of the player devices 102*a-n* may comprise devices owned and/or operated by one or more users such as online and/or in-casino (e.g., in-person) wagering game players, wagerers, spectators, etc. In some embodiments, one or more of the player devices 102*a-n* may be owned by and/or may be proprietary to a casino (or other wagering game entity or establishment) and may be leased, rented, and/or loaned to the respective players. According to some embodiments, the player devices 102*a-n* may comprise components and/or peripherals of the physical wagering game device 110 and/or may comprise one or more wagering game playing chips, figures, tokens, and/or plaques (e.g., physical objects comprising one or more short-range wireless communication devices (such as Radio Frequency Identification (RFID)) and/or that store one or more data elements).

In some embodiments, the player devices 102*a-n* may communicate with the tournament controller device 160 via the network 104 to participate in one or more online, remote, virtual, simulated, mechanical, and/or electronic wagering games. According to some embodiments, the player devices 102*a-n* may interface with the tournament controller device 160 to effectuate communications (direct or indirect) with one or more other player devices 102*a-n* (such communication not explicitly shown in FIG. 1) operated by other users such as other competitive or cooperative tournament players, for example. In some embodiments, the player devices 102*a-n* may directly interface with the database 140 and/or the dealer device 116 (e.g., the physical wagering game device 110).

The network 104 may, according to some embodiments, comprise a LAN (wireless and/or wired), cellular telephone, Bluetooth® and/or Bluetooth® Low Energy (BLE), Near Field Communication (NFC), and/or Radio Frequency (RF) network with communication links between the physical wagering game device 110, the player devices 102*a-n*, the tournament controller device 160, and/or the database 140. In some embodiments, the network 104 may comprise direct communications links between any or all of the components 102*a-n*, 110, 116,140, 160 of the system 100. The player devices 102*a-n* may, for example, be directly interfaced or connected to one or more of the physical wagering game device 110 and/or the tournament controller device 160 via one or more wires, cables, wireless links, and/or other network components, such network components (e.g., communication links) comprising portions of the network 104. In some embodiments, the network 104 may comprise one or many other links or network components other than those depicted in FIG. 1. The player devices 102*a-n* may, for example, be connected to the tournament controller device 160 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 110, 116, 140, 160 of the system 100. The network 104 may comprise one or more cellular telephone networks with communication links between the player devices 102*a-n* and the tournament controller device 160, for example, and/or may comprise one or more short-range wireless network and/or wired connections between one or more of the player devices 102*a-n* and the physical wagering game device 110 (and/or the dealer device 116 thereof).

According to some embodiments, the physical wagering game device 110 may comprise one or more objects and/or devices that are utilized to conduct a physical wagering game. The physical wagering game device 110 may comprise various static, mechanical, electrical, and/or electromechanical devices or objects, for example, such as one or more tables, surfaces, wheels, boards, cabinets, display screens (e.g., output devices), touchpads (e.g., input devices), sensors, card readers, card shoes, chip trays, pull handles, buttons, switches, seating positions, pegs, balls, dice, and/or wagering or playing chips, figures, tokens, and/or plaques. In some embodiments, the physical wagering game device 110 may be disposed in a particular location (not separately shown in FIG. 1) such as a particular casino, building, room, area, etc. According to some embodiments, the physical wagering game device 110 may be operable with one or more of the player devices 102*a-n* to conduct an in-casino and/or online wagering game. The player devices 102*a-n* may, in some embodiments, comprise one or more physical chips or tokens such as RFID-enabled chips that are operable to interact with corresponding sensors of the physical wagering game device 110 to conduct an electronically-enhanced in-casino wagering game such as poker, craps, roulette, baccarat, etc. According to some embodiments, the player devices 102*a-n* may comprise one or more portable electronic devices that permit the respective players to participate in the wagering game at the physical wagering game device 110 from a remote location. In some embodiments, the dealer device 116 may comprise one or more objects with which a dealer (not shown in FIG. 1) may interact to perform various wagering game-enabling actions. The dealer device 116 may comprise, for example, an interactive touchscreen device (e.g., Input/Output (I/O) device) disposed at a dealer position (not shown in FIG. 1) and via which information descriptive of the wagering game, players of the wagering game, wagers, and/or the player devices 102*a-n*, may be provided to the dealer. According to some embodiments, the dealer device 116 may be utilized by the dealer to: (i) identify and/or or authenticate or verify tournament players, (ii) identify and/or or authenticate or verify non-tournament (e.g., "regular") players, (iii) identify and/or or authenticate or verify tournament player perks, enhancements, modifiers, etc., (iv) identify and/or or authenticate or verify wagers, (v) identify and/or or authenticate or verify wagering game inputs, actions, moves, and/or decisions of a player, and/or (vi) trigger wagering game actions, events, calculations, and/or processes.

In some embodiments, the physical wagering game device 110 and/or the dealer device 116 (and/or the player devices 102_a-n_) may be in communication with the database 140. The database 140 may store, for example, wagering game data, player data, and/or instructions that cause various devices and/or components (e.g., the physical wagering game device 110, the dealer device 116, the tournament controller device 160, and/or the player devices 102_a-n_) to operate in accordance with embodiments described herein. The database 140 may store, for example, one or more batch job and/or executable files, data transformation scripts, wager data, pay tables, decision-making data (e.g., thresholds and/or logic), and/or coded instructions (e.g., defining the wagering game and/or components thereof). In some embodiments, the database 140 may comprise any type, configuration, and/or quantity of data storage devices that are or become known or practicable. The database 140 may, for example, comprise an array of optical and/or solid-state hard drives configured to store copies of various production and/or operational data, test data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102_a-n_ may comprise the database 140 or a portion thereof, for example, and/or the tournament controller device 160 and/or the physical wagering game device 110 may comprise the database 140 or a portion thereof.

In some embodiments, the tournament controller device 160 may comprise an electronic and/or computerized controller device, such as a computer server communicatively coupled to interface with the player devices 102_a-n_ and/or the physical wagering game device 110 or dealer device 116 thereof (directly and/or indirectly). The tournament controller device 160 may, for example, comprise one or more PowerEdge™ R840 rack servers manufactured by Dell®, Inc. of Round Rock, TX, which may include one or more Twelve-Core Intel® Xeon® E5-4640 v4 electronic processing devices. In some embodiments, the tournament controller device 160 may comprise a plurality of processing devices specially programmed to execute and/or conduct processes that are not practicable without the aid of the tournament controller device 160. The tournament controller device 160 may, for example, execute wagering game tournament instructions that are operable to process hundreds or thousands of tournament player transactions and/or requests (e.g., from the player devices 102_a-n_ and/or from the physical wagering game device 110) simultaneously, as described herein, such automatic multi-player wagering game data management services not being capable of being conducted without the benefit of the specially-programmed tournament controller device 160, particularly not within timeframes that prevent excessive queuing and/or delays (e.g., within a matter of second or minutes, depending upon the type of wagering game(s)). According to some embodiments, the tournament controller device 160 may be located remotely from one or more of the player devices 102_a-n_ and/or the database 140. The tournament controller device 160 may also or alternatively comprise a plurality of electronic processing devices located at one or more various sites and/or locations.

According to some embodiments, the tournament controller device 160 may store and/or execute specially programmed instructions to operate in accordance with embodiments described herein. The tournament controller device 160 may, for example, execute combined and/or hybrid online and in-casino wagering game tournament instructions that permit players to participate in a tournament utilizing either or both of online and in-casino means, as described herein. According to some embodiments, the tournament controller device 160 may comprise a computerized processing device, such as a computer server and/or other electronic device to manage and/or facilitate wagers and/or wagering game communications to and/or from the player devices 102_a-n_ and the dealer device 116. A wagering game player utilizing one or more of the user devices 102_a-n_ may, for example, effectuate communications with the tournament controller device 160, such as by joining an online and/or in-casino wagering game as a tournament player, as described herein Turning now to FIG. 2, a block diagram of a system 200 according to some embodiments is shown. In some embodiments, the system 200 may be useful in facilitating some embodiments described herein, such as in which a player is able to begin participating in a wagering game tournament while present at a brick and mortar casino (e.g., in-casino) but then play at least some of the tournament online (e.g., via his/her mobile device and from a remote location). It should be noted that although system 200 (and other systems described herein) includes use of a mobile user device, embodiments described herein are not limited to use with mobile user devices (although the embodiments are described mainly with reference to such devices, for ease of understanding). Rather, many embodiments described herein are applicable to any computing device that may be operable to store a code or a voucher as the term is used herein. Accordingly, any reference to a "mobile user device" herein should be understood to equally refer to any such computing device, as appropriate.

According to some embodiments, the system 200 may comprise a mobile user device 202, a gaming device 210, a tournament prize redemption terminal 230, an online tournament server 260_a_, and/or a casino tournament server 260_b_. In some embodiments, each of the casino tournament server 260_b_, the tournament prize redemption terminal 230, and the gaming device 210 may be located in or associated with a "Brick 'N Mortar" casino 270 (the term "Brick 'N Mortar", synonymous with "brick and mortar", being intended to refer to a casino with a physical location which users may visit to play games or obtain other entertainment services or to patronize restaurants or other services which may be offered by such an establishment). The various devices of system 200 may be operable to communicate with at least one other device of system 200 via a network (not separately shown in FIG. 2). The network may comprise, for example, the Internet, a wide area network, another network or a combination of such networks. Additionally, in some embodiments one or more of the devices may be located behind a firewall (also not separately depicted). It should be understood that although not shown in FIG. 2, other networks and devices may be in communication with any of the devices 202, 210, 230, 260_a-b_ of system 200. For example, the mobile user device 202 may be in communication with a mobile network (not shown) such as a Wi-Fi® and/or cellular telephone network that accommodates wireless communication with mobile devices as is generally known to those skilled in the art.

The mobile user device 202 may comprise, for example, a computing device operable to receive and/or data regarding online participation in a wagering game tournament (e.g., via an app stored on the mobile user device which is programmed to retrieve such data from an authorized entity or online tournament server 260*a*). In some embodiments the mobile user device 202 may comprise a mobile or portable computing device such as a smartphone (e.g., the iPhone® manufactured by Apple®, the Galaxy® manufactured by Samsung®, the Pre® manufactured by Palm® or the Droid® manufactured by Motorola®), a PDA, cellular telephone, laptop or other portable computing device. It should be understood that although only one mobile user device 202 is illustrated, the system 200 may be operable to support any number and various types of mobile user devices 202. In some embodiments, a mobile user device 202 may comprise a dedicated gaming device or a casino mobile device.

According to some embodiments, the online tournament server 260*a* may comprise one or more computing devices, working in parallel or series if more than one, operable to facilitate online play or participation in a tournament, wherein players entered the tournament and/or began participating in the tournament while physically present at a brick and mortar casino and/or earning of prizes as a result of participation in such tournaments. For example, in some embodiments the online tournament server 260*a* may receive data from the casino tournament server 260*b* descriptive of a tournament that has been opened or made available to players. Such data may include, for example, a unique identifier for the tournament, information defining the tournament (e.g., a start time and end time, number of available player spots, login credentials for participating in the tournament online, etc.). In some embodiments, such data may also or alternatively include information identifying one or more players registered to participate in the tournament (e.g., a player identifier).

In accordance with some embodiments, the online tournament server 260*a* may make available, via one or more tournament interfaces (not shown in FIG. 2) as may be output to players via mobile devices (e.g., the mobile user device 202) of the players (e.g., via an app facilitated by the online tournament server 260*a*), online participation in the tournament by players who have registered to play in the tournament while at a corresponding brick and mortar casino (e.g., the casino 270). For example, the online tournament server 260*a* may utilize at least some of information received from the casino tournament server 260*b* to verify which players have previously registered at the brick and mortar casino 270 to participate in a given tournament, verify log in attempts from players for a given tournament and/or retrieve and output the appropriate tournament game play data to a given player (and, in some embodiments, data indicative of the progress of other players participating in the tournament). The online tournament server 260*a* may also, in some embodiments, be operable to facilitate online participation in a given tournament by (i) serving to participating players' game information (e.g., as received from one or more game servers (not shown), for providing games available for play in the tournament); (ii) accepting input from players participating in the tournament (e.g., wagers, selections, decisions, game play initiations, etc.); and/or (iii) determining and/or storing results of game play of players participating in the tournament (e.g., outcomes received by the players, results of individual game plays, etc.). In some embodiments, the online tournament server 260*a* may further be operable to transmit to the casino tournament server 260*b* data resulting from players' online participation in a given tournament (e.g., outcomes, decisions, etc.). The casino tournament server 260*b* may then utilize this information, for example, to determine results and/or prizes won as a result of the tournament (e.g., once the end time of a tournament occurs and all game play is complete).

In some embodiments, data indicating one or more prizes won by a player as a result of online and/or in-casino participation in a tournament may be determined and/or issued by the online tournament server 260*a* (e.g., a virtual coupon or prize ticket (not shown in FIG. 2) for subsequent redemption in the brick and mortar casino 270 at which the player first registered to participate in the tournament). In some embodiments a processor (e.g., one or more microprocessors, one or more microcontrollers, one or more digital signal processors; not separately shown in FIG. 2) of the online tournament server 260*a* may receive instructions (e.g., from a memory or like device; also not separately depicted in FIG. 2), and execute those instructions, thereby performing one or more processes defined by those instructions and corresponding to one or more embodiments described herein (e.g., the methods 600, 700 of FIG. 6 and/or FIG. 7 herein, and/or portions or combinations thereof). Instructions may be embodied in, e.g., one or more computer programs and/or one or more scripts, firmware encodings, executable files, logical routines, thresholds, etc.

In some embodiments, the casino tournament server 260*b* may comprise a device operable to facilitate participation in one or more wagering game tournaments being offered by Brick 'N Mortar casino 270. In some embodiments the casino tournament server 260*b* may be operable to allow: (i) registration in one or more such tournaments by a player physically present at the brick and mortar casino 270 (e.g., a player can register for participation in such one or more tournaments via an interface of the gaming device 210 that is in communication with the casino tournament server 260*b*); (ii) participation in one or more game plays comprising the tournament via one or more gaming devices 210 that are physically located at the brick and mortar casino 270; and/or (iii) redemption of prizes won as a result of participation in a tournament, e.g., via the tournament prize redemption device 230 in the casino 270. As an example of (iii), in one embodiment the casino tournament server 260*b* may collect data from one or more online tournament servers 260*a* regarding online participation in a particular tournament by players registered for that tournament, combine this with data of participation in the same tournament within the brick and mortar casino 270, determine prizes won once the tournament is completed and all participation/play data collected and transmit data allowing redemption of such prizes to one or more tournament prize redemption devices 230, one or more player devices 202 and/or one or more gaming devices 210. In some embodiments, providing a benefit may comprise providing the benefit to a user by either printing a tangible medium (e.g., a coupon, cashless gaming receipt or ticket; not shown in FIG. 2), providing a tangible medium to the player (e.g., a wagering chip usable at a table game of the casino or a stored value card usable at a gaming machine at the casino) or adding value to an account or stored value card of the user (e.g., adding a number of credits to a slot card or player account of the player, the credits being usable for wagering and/or obtaining non-wagering goods or services at the Brick 'N Mortar casino 270).

In accordance with some embodiments, the online tournament server 260*a* and/or the casino tournament server 260*b* may manage the progress of one or more tournaments (in some embodiments one of these servers 260*a*, 260*b* may be primarily tasked with the management while in another embodiment the servers 260*a*, 260*b* may work together to facilitate the management). For example, a given tournament may begin and end within a predetermined period of time, which may be measured in hours and/or minutes. After each tournament is over, the system 200 (e.g., the online tournament server 260*a* and/or the casino tournament server 260*b*) may evaluate, based on data collected or received during the tournament, each player's performance and award prizes to those players achieving pre-established performance levels. In some embodiments, if the online tournament server 260*a* determines that a player has qualified for a prize as a result of the tournament, the online tournament server 260*a* (and/or the casino tournament server 260*b*) may generate a prize code that is redeemable for the appropriate prize at the brick and mortar casino 270 hosting the tournament. For example, the prize code may be generated and stored in a tournament app stored on the players mobile user device 202 (e.g., in the form of a bar code), which may be presented to casino personnel and/or a tournament prize redemption device 230 (e.g., a kiosk functional to facilitate such redemption, a POS or a register at a casino cage or other area of the casino 270).

In some embodiments in which multiple tournaments may be made available by the system 200, a database (not shown in FIG. 2) may be employed to help track and evaluate the play data corresponding to each respective tournament. For example, the casino tournament server 260*b* may be operable to access the database to store player information that is generated as the player participates in the tournament (e.g., data received from one or more gaming devices 210 and/or online tournament server 260*a*). The casino tournament server 260*b* may also store in such a database any valid prize codes corresponding to prizes awarded as a result of the tournament (e.g., in association with the player identifiers of the players who have qualified to win the prizes, as determined at the end of the tournament).

Figure 2:
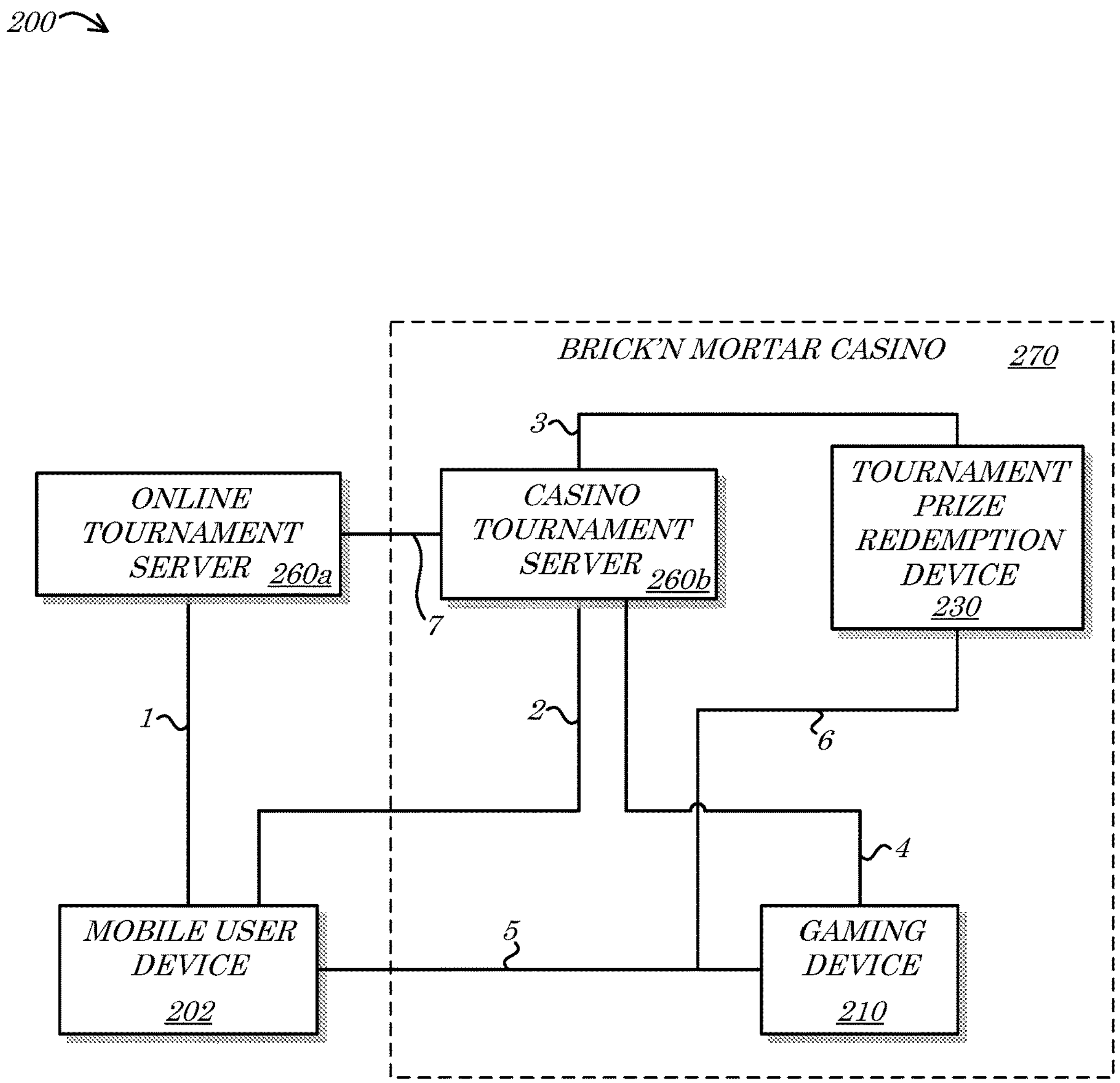
FIG. 2 is a block diagram of a system according to some embodiments.

As described herein and illustrated in FIG. 2, the casino tournament server 260*b* may be operable to receive and/or transmit data to the mobile user device 202 (e.g., via communication pathway "2"), the online tournament server 260*a* (via a communication pathway "7"), the tournament prize redemption device 230 (via a communication pathway "3"), and/or the gaming device 210 (via a communication pathway "4"). Examples of data which the casino tournament server 260*b* may be operable to receive include, without limitation: (i) data associated with a tournament in association with a request to redeem a prize won as a result of the tournament (e.g., data from the mobile user device 202 regarding a prize which a user desires to redeem); and/or (ii) authorization or information sufficient to authorize allowance of redemption of a tournament prize (e.g., authorization from the online tournament server 260*a* or a third party server (not shown) for a currently requested redemption of a prize and/or data indicative of issued and valid prize redemption codes which may subsequently be used to authorize or deny redemption of such prizes). As also described herein and illustrated in FIG. 2, the casino tournament server 260*b* may be operable to transmit or output data or information to the mobile user device 202 (e.g., via the communication pathway "2"), the online tournament server 260*a* (via the communication pathway "7"), the tournament prize redemption device 230 (via the communication pathway "3"), and/or the gaming device 210 (via the communication pathway "4"). In some embodiments, information may be exchanged (e.g., transmitted and/or received) between the online tournament server 260*a* and the mobile user device 202 (via the communication pathway "1"), between the mobile user device 202 and the gaming device 210 (via the communication pathway "5"), and/or between the gaming device 210 (and/or the mobile user device 202) and the tournament prize redemption device 230 (via the communication pathway "6").

Examples of data or information that the casino tournament server 260*b* may transmit to other devices 202, 210, 230, 260*a* of the system 200 include, without limitation: (i) an indication to the mobile user device 202 that a prize or prize code may be or has been successfully authorized for redemption or a denial of a requested redemption; (ii) an indication, to the mobile user device 202, of a benefit for which a prize code is being redeemed or the benefit itself; (iii) instructions to the tournament prize redemption device 230 and/or the game device 210, to facilitate redemption of a prize; and/or (iv) instructions to a printing device (not shown) causing printing of a physical substrate such as a coupon, receipt which is readable by a casino employee, tournament prize redemption device 230 and/or gaming device 210 to allow the user to obtain a benefit defined by an authorized prize redemption code or similar data. For example, assuming the benefit defined by a prize code is ten (10) free game plays on (or at) the gaming device 210, the tournament prize redemption device 230 may transmit data to the gaming device 210 to allow a user redeeming the prize code for ten (10) free game plays at the gaming device 210. In another example, assuming the benefit defined by a prize code is a free or discounted meal at a restaurant of the Brick 'N Mortar casino 270, the casino tournament server 260*b* may transmit data to the tournament prize redemption device 230 comprising a POS at the restaurant, allowing the associated user to obtain the meal at the discount or cost free. In yet another example, assuming the benefit defined by a prize code is five hundred dollars ($500.00 USD), the tournament prize redemption device 230 at a casino cage may be programmed to authenticate the prize code and authorize casino personnel to provide the player casino chips usable at table games of the casino valued at five hundred dollars ($500.00 USD).

According to some embodiments, the tournament prize redemption device 230 may comprise any device operable to facilitate a users redemption of a prize earned or won via a tournament played in accordance with embodiments described herein. While in some embodiments the tournament prize redemption device 230 may comprise a standalone kiosk or computing device in the casino 270, the main function of which is to allow redemption of tournament prizes, in other embodiments the tournament prize redemption device 230 may comprise a device operable to facilitate other functionalities in addition to redemption of tournament prizes, such as a point-of-sale or register in a casino cage or other casino location manned by casino personnel or the gaming device 210.

In some embodiments, the tournament prize redemption device 230 may be operable to transmit data or otherwise communicate with another device not illustrated in FIG. 2, to facilitate redemption of a prize (e.g., to a tablet or handheld device of a casino employee, to a server which maintains player financial accounts, to a stored value card of a player).

According to some embodiments, the gaming device 210 may comprise a dedicated device or a casino mobile device, such as a slot machine, video gaming machine, electronic or smart table for facilitating table games or a tablet device. In some embodiments, the gaming device 210 may comprise an electronic game table equipped with RFID components or other components operable to read data from wagering chips or other elements used at or near the table, such as an electronic game table described in the following U.S. Patent Applications: (i) U.S. patent application Ser. No. 13/513,994 filed on Jun. 5, 2012 and titled METHODS AND SYSTEMS FOR FACILITATING TABLE GAMES; (ii) U.S. patent application Ser. No. 15/813,151 filed on Nov. 14, 2017 and titled SYSTEMS AND METHODS FOR UTILIZING RFID TECHNOLOGY TO FACILITATE A GAMING SYSTEM; and (iii) U.S. application Ser. No. 16/175,826 filed on Oct. 30, 2018 and titled SYSTEMS AND METHODS FOR DISTINGUISHING MULTIPLE DISTINCT WAGERS AT A SINGLE BET SPOT OF A GAME TABLE. The descriptions of the components and functionalities of the smart tables in these U.S. Patent Applications are incorporated by reference herein for all purposes.

It should be noted that although the mobile user device 202, the tournament prize redemption device 230 and the gaming device 210 are illustrated in system 200 as distinct devices, in some embodiments either a mobile user device 202 or a gaming device 210 may serve as the tournament prize redemption device 230 in the sense that either the mobile user device 202 or the gaming device 210 may be operable to facilitate any of the functionality described herein with respect to the tournament prize redemption device 230. For example, in some embodiments a user having an indication of a voucher stored on his mobile user device 202 may cause the mobile user device 202 to communicate directly with the gaming device 210 in order to redeem a prize (assuming the benefit of the voucher is a benefit usable via the gaming device 210).

It should be understood that each of the devices 202, 210, 230, 260*a-b* may communicate directly or indirectly, via a wired or wireless medium such as the Internet, LAN, WAN or Ethernet, Token Ring, or via any appropriate communications means or combination of communications means. For example, in some embodiments communication among any and all of the devices 202, 210, 230, 260*a-b* of the system 200 may occur over the Internet through a Web site maintained by computer on a remote server or over an on-line data network including commercial on-line service providers, bulletin board systems and the like. In yet other embodiments, communication among any of the devices 202, 210, 230, 260*a-b* of the system 200 may occur over RF, cable TV, satellite links and the like. Any of the foregoing may comprise any of the respective pathways "1" through "7" illustrated in FIG. 2.

According to some embodiments, the system 100 may be operable to facilitate communication among the devices 202, 210, 230, 260*a-b* using known communication protocols. Possible communication protocols that may be part of the system 100 include, but are not limited to: Ethernet (or IEEE 802.3), ATP, BLUETOOTH, HTTP, HTTPS and Transmission Control Protocol/Internet Protocol (TCP/IP). Communication may be encrypted to ensure privacy and prevent fraud in any of a variety of ways well known in the art, some of which are described herein. Any of the foregoing communication protocols (or other known communication protocols) may be used to facilitate communication along the communication pathways "1" through "7".

Fewer or more components 202, 210, 230, 260*a-b*, 270 and/or various configurations of the depicted components 202, 210, 230, 260*a-b*, 270 may be included in the system 200 without deviating from the scope of embodiments described herein. In some embodiments, the components 202, 210, 230, 260*a-b*, 270 may be similar in configuration and/or functionality to similarly named and/or numbered components as described herein. In some embodiments, the system 200 (and/or portion thereof) may comprise a combined online and in-casino wagering game tournament program, system, and/or platform programmed and/or otherwise configured to execute, conduct, and/or facilitate the methods 600, 700 of FIG. 6 and/or FIG. 7 herein, and/or portions or combinations thereof.

Figure 3:
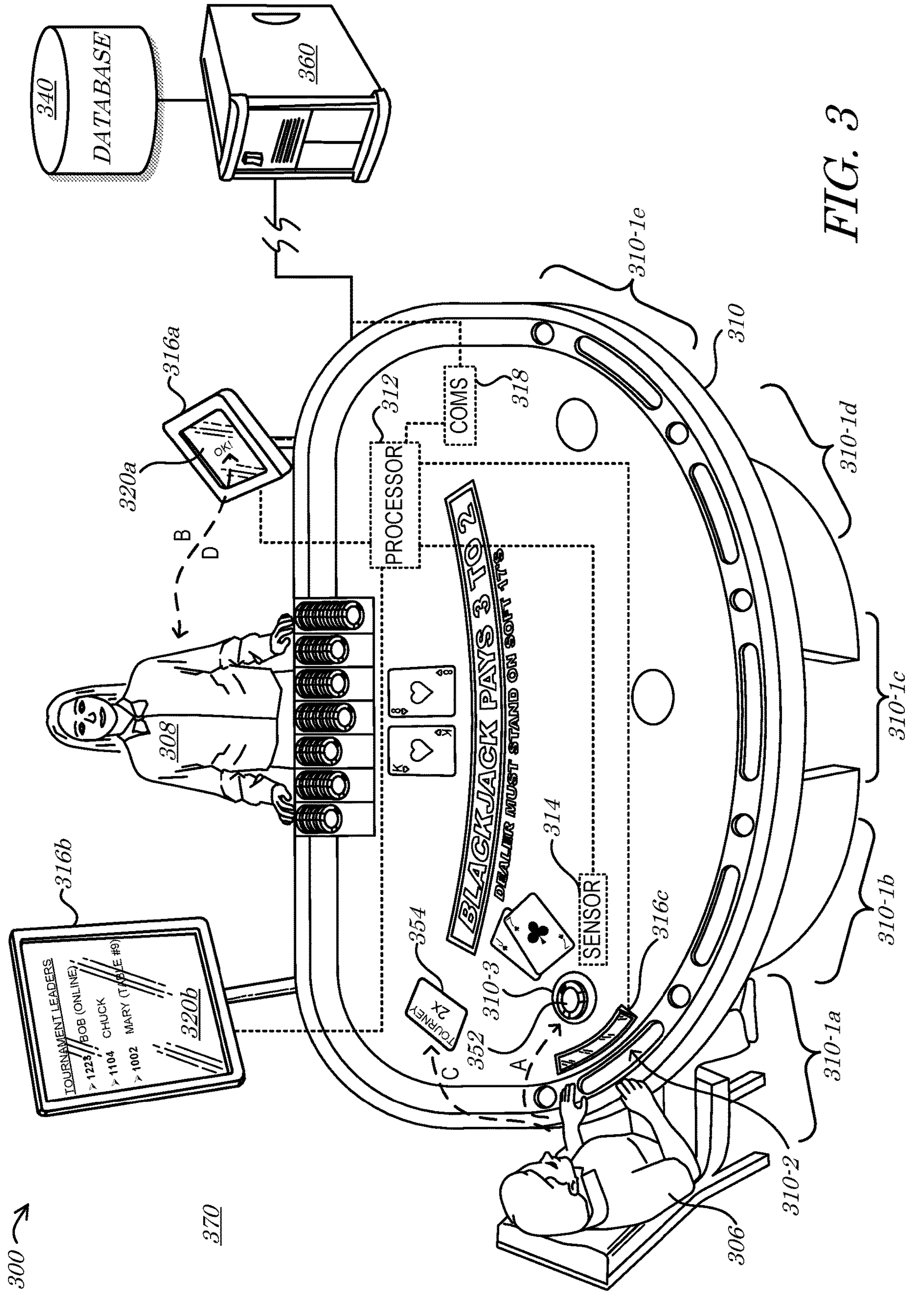
FIG. 3 is a block diagram of a system according to some embodiments.

Referring now to FIG. 3, a block diagram of a system 300 according to some embodiments is shown. In some embodiments, the system 300 may comprise one or more wagering game players 306, a wagering game dealer 308, and/or a gaming device or gaming table 310 which comprises an electronic gaming table operable to facilitate a table game (e.g., a physical version of a gambling or wagering game). The particular table game that the table 310 is operable to facilitate in the depiction of FIG. 3 is a blackjack game, although other types of table games may be similarly supported (e.g., poker or baccarat). The table 310 may, in some embodiments, comprise and/or define five (5) player positions 310-1*a*, 310-1*b*, 310-1*c*, 310-1*d*, 310-1*e*, each player position 310-1*a*, 310-1*b*, 310-1*c*, 310-1*d*, 310-1*e* including one or more of a chip tray 310-2, and/or a bet spot 310-3, in accordance with the rules for the particular wagering game to be played. Of course, any number of player positions 310-1*a*, 310-1*b*, 310-1*c*, 310-1*d*, 310-1*e* may be utilized.

In some embodiments, the table 310 may comprise the electronic or "smart" table shown and may comprise an electronic and/or computerized processor 312, a sensor 314, one or more displays 316*a-c* (such as a dealer display 316*a*, a table display 316*b*, and/or a player display 316*c*), and/or a network or communication (e.g., "coms") device 318. According to some embodiments, the dealer display 316*a* may provide, generate, and/or output a first or dealer interface 320*a* and/or the table display 316*b* may provide, generate, and/or output a second or table interface 320*b*. According to some embodiments, and although not pictured in FIG. 3, one or more other players may participate in the wagering game at the table 310 remotely (e.g., via the coms device 318). According to some embodiments, data indicative of game play at the table 310 may be stored in one or more memory devices such as in a remote database 340 (e.g., in communication with the table 310 via the coms device 318). In some embodiments, play of the wagering game at the table 310 may involve and/or utilize one or more chips or tokens 352 and/or one or more perk cards 354. Tokens 352 may be utilized to place wagers totaling particular amounts (e.g., as indicated on the face of the tokens 352), for example, and/or may be utilized to pass information to the table 310 and/or the dealer 308 (e.g., an indication that the player 306 is a player in a particular tournament). The perk cards 354 may be utilized, in some embodiments, to modify play of the wagering game for the player 306.

According to some embodiments, the dealer 308 or other gaming establishment personnel may utilize the dealer display 316*a* (and/or the dealer interface 320*a*) to access information regarding game events, transactions, chip tray variances or other data related to the table 310. For example, in some embodiments it may turn out to be the case that, at a given time, there are some players 306 playing at the table 310 who are participating in a tournament and other players 306 who are not (e.g., as indicated by the presence or lack of presence of a token 352 in association with a particular player positions 310-1*a*, 310-1*b*, 310-1*c*, 310-1*d*, 310-1*e*. And it may even turn out to be the case that the players 306 who are participating in a tournament are participating in different tournaments. In some embodiments, the results of the player's hands may accordingly be transmitted to a server 360 that manages such one or more tournaments (e.g., the online tournament server 260*a* and/or the casino tournament server 260*b* of FIG. 2 herein).

According to some embodiments, the dealer display 316*a* may (among other things) be operable to display to the dealer 308 which players 306 are registered for tournament(s) that are currently open and whose play results are being tracked for purposes of such tournament(s). In some embodiments, it may be that the dealer 308 treats (or is directed to treat) players 306 who are participating in tournaments and whose game play results are being tracked for such tournaments differently than players 306 who are playing at the table but not currently participating in an open tournament. In such embodiments, the dealer display 316*a* may output to the dealer 308, via the dealer interface 320*a*, information indicating to the dealer 308 different rules or treatment to be applied to any players 306 at the table who are currently participating in an open tournament. For example, the dealer interface 320*a* may be output on the dealer display 316*a* that indicates which players 306 currently playing at which player positions 310-1*a*, 310-1*b*, 310-1*c*, 310-1*d*, 310-1*e* of the table 310 are currently participating in a respective tournament and thus having their game play results tracked for purposes of tracking progress in the respective tournaments, with the tournaments being indicated by unique tournament identifiers or other means (e.g., indicated by one or more tokens 352). The following example matrix illustrates the type of information that may be output to a dealer 308 via the dealer display 316*a*:

| Player Position | Player Identifier | Player Name | Tournament participant? | Tournament Identifier |
|---|---|---|---|---|
| 1 | P-143829 | Joe B. | Y | T-33 |
| 2 | P-372819 | Anna G. | N | |
| 3 | P-039283 | George A. | N | |
| 4 | P-839291 | Chuck K. | Y | T-09 |
| 5 | P-378291 | Jane S. | Y | T-33 |

As can be seen from the matrix above, in the illustrated scenario, out of the five (5) players currently playing at the table 310 corresponding to the matrix, three (3) player 306 are currently participating in an open tournament and two (2) of these three (3) are participating in the same tournament (e.g., "T-33") while the third tournament participant/player 306 is participating in a different tournament (e.g., "T-09").

It should be noted that although this information is illustrated in a matrix/table format for purposes of the present example, any format may be utilized to convey such information—for example, a graphical depiction of the table 310 may be output, with icons or graphics indicating the different players 306 currently playing at the table and an visual indicator of which of these players 306 are currently participating in an open tournament (e.g., different colors of the player icons may be utilized to indicate tournament participants vs. non-tournament participants).

In existing tournament implementations of tournaments for table games, an entire table or multiple tables are typically reserved for tournament play. Thus, there is not a situation in which some players playing at a table are participating in an open tournament while others are not (much less that different players at the table are participating in different tournaments while some players are not participating in a tournament at all). Prior to the embodiments described herein, there was no need to identify or track at a given table which players playing at the table (e.g., placing wagers and having cards dealt to them) are currently participating in an open tournament and thus should have their game play results tracked and recorded for purposes of tracking progress of the tournament because it was either all players at a given table whose play was part of a tournament or none of the players.

According to some embodiments, the gaming device/table 310 may further include the table display 316*b* which faces the players 306/player positions 310-1*a*, 310-1*b*, 310-1*c*, 310-1*d*, 310-1*e* and may show data to players 306 (via the table interface 320*b*) such as recent historical outcomes (sometimes referred to as a "trend board"). Players 306 sometimes use such historical outcomes in an effort to predict trends within a series of game instances. In accordance with some embodiments, the table display 316*b* may also (or alternatively) output an indication of which players 306 currently playing at the table are doing so while participating in an open tournament (or an indication of how many players 306 at the table are doing so, such as if anonymity of which players 306 are participating is desired). In the example depicted in FIG. 3, the table interface 320*b* may output an indication of tournament participants along with their respective scores, ranks, and/or standings in the tournament—e.g., a "leader board".

In some embodiments, the gaming device/table 310 may include and/or be in communication with various peripheral and/or supporting devices (not shown) such as an electronic card shoe via which cards for the game are shuffled and dealt. In accordance with some embodiments, the electronic card shoe may communicate with the processor 312 to communicate data regarding cards dealt and/or remaining in the shoe. According to some embodiments, the gaming device/table 310 may include additional components (at least some of which may not be easily visible to a player or other observer) such as a memory storing a general program and one or more specialized software applications which, in combination with data obtained from the sensor 314 (e.g., one of multiple RFID antennas located on the table 310), may facilitate many of the functions described herein (e.g., determining that a player 306 who has begun play at the table 310 is currently registered in an open tournament and therefore transmitting information comprising game play results for that player 306 to the server 360 for purposes of allowing the server 360 to determine the players progress in the tournament, etc.). In accordance with some embodiments, the gaming device/table 310 may include the sensor 314. The sensor 314 may comprise, for example, one or more sensors under the surface or covering of the table 310 such as may be mounted under the felt or other covering, to allow for recognizing game play data and/or game play results (e.g., which cards have been dealt to the dealer 308 or to a player position 310-1*a*, 310-1*b*, 310-1*c*, 310-1*d*, 310-1*e* and/or value of chips or tokens 352 wagered at a particular player position 310-1*a*, 310-1*b*, 310-1*c*, 310-1*d*, 310-1*e*).

According to some embodiments, the table 310 may be utilized to conduct a combined and/or hybrid online and in-casino tournament. In some embodiments, the table 310 (and accordingly the player 306 and the dealer 308) may be disposed or situated in a particular or first physical location such as a casino 370. One or more in-casino (e.g., physically located in the casino 370 at the table 310) players 306 may be seated at the various player positions 310-1*a*, 310-1*b*, 310-1*c*, 310-1*d*, 310-1*e*, for example, with a single player 306 being seated at a first player position 310-1*a* in FIG. 3 solely for ease of illustration. In some embodiments, any player 306 at the table 310 may participate (or not) in any available tournament that is currently open, e.g., even if the table 310 itself is not assigned to a particular tournament. According to some embodiments, a tournament participant player 306 may indicate their participation by utilizing the token 352. As depicted by the action path "A" in FIG. 3, for example, the player 306 may place the token 352 on the bet spot 310-3 (and/or on or in another area, not shown, e.g., designated for tournament tokens 352). In some embodiments, the token 352 may comprise an RFID-enabled object (e.g., a "smart" chip or token) that stores an indication of the tournament in which the player is participating.

According to some embodiments, the token 352 may store data indicative of the player and/or the tournament such as, but not limited to: a first tournament identifier, a second tournament identifier, tournament status (e.g., open or closed), tournament start time, tournament end time, player identifier, account balance, tournament score, etc. In some embodiments, the table 310 may automatically detect and/or read the token 352, e.g., placed in appropriate proximity to the sensor 314 (e.g., an RFID antennae). Upon placement of the token 352 upon the table 310 at "A", for example, the sensor 314 may send a signal to the processor 312 that is indicative of the presence of and/or data stored by the token 352. In some embodiments, the processor 312 may transmit a signal to the dealer display 316*a* that causes the dealer interface 320*a* to output a message to the dealer 308, at "B". The message may indicate, for example, that the player 306 seated at the first player position 310-1*a* is a participant of a particular tournament.

In some embodiments, tournament participants such as the player 306 seated at the first player position 310-1*a* may be enabled, e.g., due to their participation in the tournament (e.g., pre-registering, paying an entry fee, qualifying, etc,) for example, to modify their play of the wagering game at the table 310. As depicted by the action path "C" in FIG. 3, for example, the player 306 may place the perk card 354 on the table 310, e.g., in sight of the dealer 308 and/or on a predesignated area or spot. According to some embodiments, the perk card 354 may be automatically detected and/or read by the table 310, e.g., in a similar fashion to that described with respect to an RFID-enabled version of the token 352. In such embodiments, the dealer 308 may be altered via the dealer interface 320*a* that the perk card 354 has been activated, played, and/or authenticated. In some embodiments, the perk card 354 may comprise a non-electronic card that provides human-readable indica regarding a particular "perk" such as a point multiplier, wager multiplier, free number of hands/spins/plays, immunity to certain events (e.g., from "busting"), etc. According to some embodiments, the dealer 308 may view the perk card 354 and may enter human-readable information from the perk card 354 (e.g., and/or scan a barcode) and receive a response message via the dealer display 320*a*. The dealer 308 may enter the perk card 354 information, for example, to authenticate the perk card 354 via the server 360 (e.g., that may manage and/or run the tournament for which the perk card 354 is relevant). In some embodiments, the rules of the wagering game at the table 310 may be altered for the player 306 after placement/playing of the perk card 354 (e.g., while the rules remain unchanged for other, non-tournament and/or non-perk players 306).

Fewer or more components 306, 308, 310, 310-1*a*, 310-1*b*, 310-1*c*, 310-1*d*, 310-1*e*, 310-2, 310-3, 312, 314, 316*a-c*, 318, 320*a-b*, 340, 352, 354, 360, 370 and/or various configurations of the depicted components 306, 308, 310, 310-1*a*, 310-1*b*, 310-1*c*, 310-1*d*, 310-1*e*, 310-2, 310-3, 312, 314, 316*a-c*, 318, 320*a-b*, 340, 352, 354, 360, 370 may be included in the system 300 without deviating from the scope of embodiments described herein. In some embodiments, the components 306, 308, 310, 310-1*a*, 310-1*b*, 310-1*c*, 310-1*d*, 310-1*e*, 310-2, 310-3, 312, 314, 316*a-c*, 318, 320*a-b*, 340, 352, 354, 360, 370 may be similar in configuration and/or functionality to similarly named and/or numbered components as described herein. In some embodiments, the system 300 (and/or portion thereof) may comprise a combined online and in-casino wagering game tournament program, system, and/or platform programmed and/or otherwise configured to execute, conduct, and/or facilitate the methods 600, 700 of FIG. 6 and/or FIG. 7 herein, and/or portions or combinations thereof.

Figure 4:
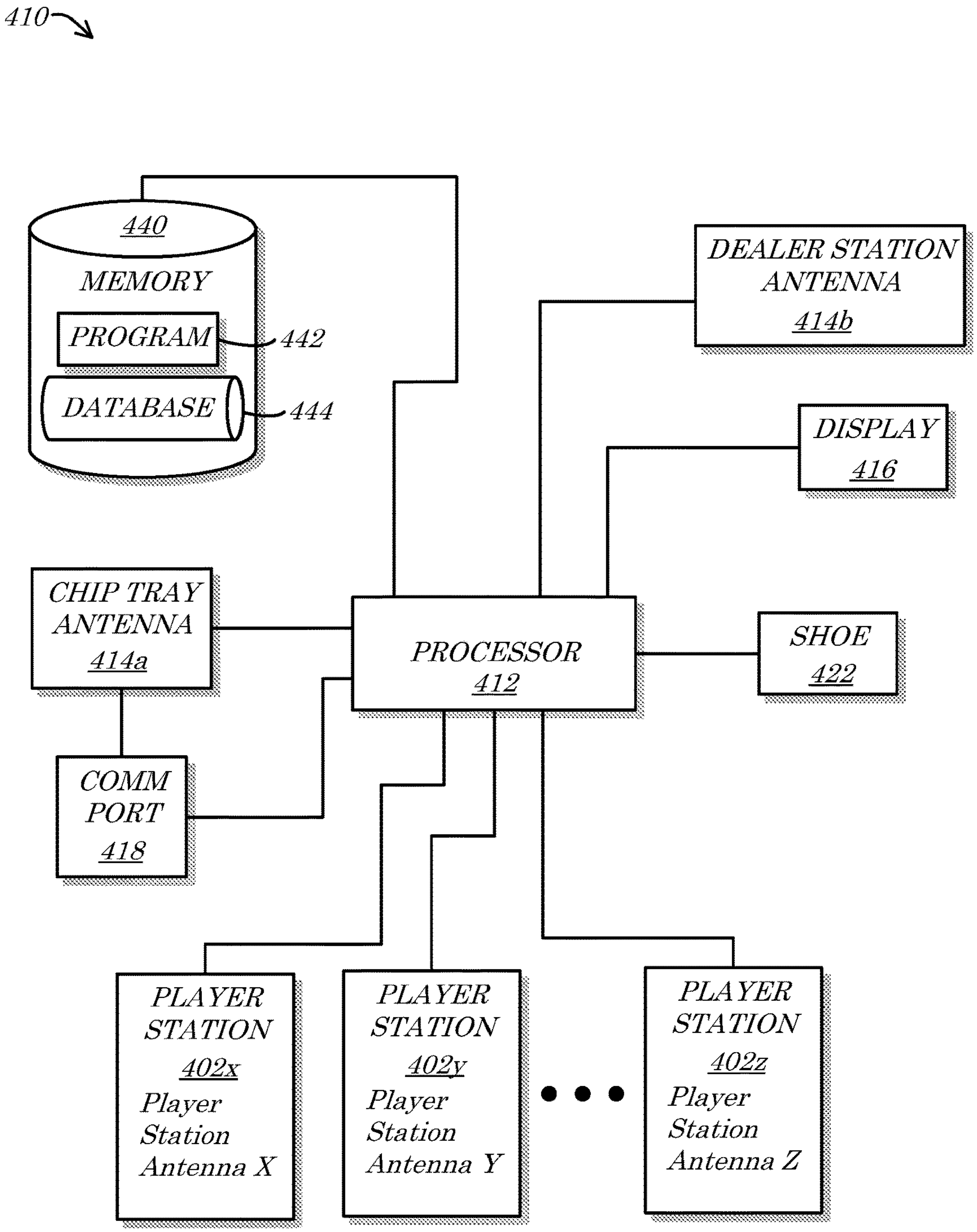
FIG. 4 is a block diagram of an apparatus according to some embodiments.

Referring now to FIG. 4, a block diagram of an apparatus 410 according to some embodiments is shown. In some embodiments, the apparatus 410 may comprise a gaming device such as the wagering game table 310 of FIG. 3 herein. According to some embodiments, the gaming device 410 may comprise a slot machine or set of slot machines that is operable to facilitate play by a plurality of players (in which embodiments the RFID antenna components of the sensor 314 in FIG. 3 may not be necessary or preferred). The gaming device 410 may be implemented as a system controller, a dedicated hardware circuit, an appropriately programmed general-purpose computer, an electronic table quipped to facilitate a table and/or card game such as baccarat, blackjack, or poker or any other equivalent electronic, mechanical or electro-mechanical device. The gaming device 410 may comprise, for example, an electronic gaming table configured to facilitate a multi-player card game such as baccarat, blackjack or poker operable to communicate with one or more remote devices involved in the conduct of an ongoing tournament. The gaming device 410, as well as other devices described herein (such as the online tournament server 260*a* and/or casino tournament server 260*b* of FIG. 2 herein), as well as components thereof, may be implemented in terms of hardware, software or a combination of hardware and software.

In some embodiments, the gaming device 410 comprises a processor 412, such as one or more Intel® Pentium® processors. The processor 412 may be in communication with a memory 440 and a communications port 418 (e.g., for communicating with one or more other devices, such as the online tournament server 260*a* and/or casino tournament server 260*b* of FIG. 2 herein). For example, the communications port 418 may be utilized to transmit an indication of game play data (e.g., results of hands) for a particular player who is currently participating in an open tournament while playing at the gaming device 410. The memory 440 may comprise any appropriate combination of magnetic, optical and/or semiconductor memory, and may include, for example, RAM, ROM, a compact disc, tape drive, and/or a hard disk. The memory 440 may comprise or include any type of computer-readable medium or computer-readable memory. The processor 412 and the memory 440 may each be, for example: (i) located entirely within a single computer or other device; or (ii) connected to each other by a remote communication medium, such as a serial port cable, telephone line or radio frequency transceiver. In some embodiments, the gaming device 410 may comprise one or more devices that are connected to a remote server computer (not shown) for maintaining databases.

The memory 440 may store a program 442 for controlling the processor 412. The processor 412 may perform instructions of the program 442, and thereby operate in accordance with at least one embodiment described herein. The program 442 may be stored in a compressed, uncompiled and/or encrypted format. The program 442 may include program elements that may be necessary or desirable, such as an operating system, a database management system and "device drivers" for allowing the processor 412 to interface with computer peripheral devices (e.g., an RFID-enabled chip tray, an electronic shoe 422, one or more cameras and/or one or more sensors, any of which may provide data to the processor 412). Appropriate program elements are known to those skilled in the art, and need not be described in detail herein. In accordance with some embodiments, program 442, a subroutine or module of program 442 or another program stored in memory 440 (or otherwise accessible to processor 412) may comprise instructions for applying at least some of the functionalities described herein.

In accordance with some embodiments, the gaming device 410 and/or the program 442 may comprise one or more software module(s) for directing the processor 412 to perform certain functions (which, in the simplified system illustration of FIG. 4, may be represented by program 442). In accordance with some embodiments, software components, applications, routines or sub-routines, or sets of instructions for causing one or more processors to perform certain functions may be referred to as "modules". It should be noted that such modules, or any software or computer program referred to herein, may be written in any computer language and may be a portion of a monolithic code base, or may be developed in more discrete code portions, such as is typical in object-oriented computer languages. In addition, the modules, or any software or computer program referred to herein, may in some embodiments be distributed across a plurality of computer platforms, servers, terminals, and the like. For example, a given module may be implemented such that the described functions are performed by separate processors and/or computing hardware platforms.

With reference to FIG. 4, it should be understood that any of the software module(s) or computer programs 442 illustrated therein may be part of a single program or integrated into various programs for controlling processor 412. Further, any of the software module(s) or computer programs illustrated therein may be stored in a compressed, uncompiled, and/or encrypted format and include instructions which, when performed by the processor 412, cause the processor 412 to operate in accordance with at least some of the methods described herein. Of course, additional and/or different software module(s) or computer programs 442 may be included and it should be understood that the example software module(s) 442 illustrated and described with respect to FIG. 4 are not necessary in all embodiments. Use of the term "module" is not intended to imply that the functionality described with reference thereto is embodied as a stand-alone or independently functioning program 442 or application. While in some embodiments functionality described with respect to a particular module may be independently functioning, in other embodiments such functionality is described with reference to a particular module for ease or convenience of description only and such functionality may in fact be a part of integrated into another module, program 442, application, or set of instructions for directing a processor of a computing device (e.g., the processor 412 of the gaming device 410).

According to an embodiment, the instructions of any or all of the software module(s) or programs 442 described with respect to FIG. 4 or otherwise herein may be read into a main memory 440 from another computer-readable medium, such from a ROM to RAM. Execution of sequences of the instructions in the software module(s) or programs 442 causes the processor 412 or another processor, as relevant, to perform at least some of the process steps described herein. In alternate embodiments, hard-wired circuitry may be used in place of, or in combination with, software instructions for implementation of the processes of the embodiments described herein. Thus, the embodiments described herein are not limited to any specific combination of hardware and software.

The term "computer-readable medium" as used herein refers to any medium that participates in providing instructions to the processor 412 (or any other processor of a device described herein) for execution. Such a medium may take many forms, including but not limited to, non-volatile media, volatile media, and transmission media. Non-volatile media include, for example, optical or magnetic disks, such as the memory 440. Volatile media include DRAM, which typically constitutes the main memory 440. Transmission media include coaxial cables, copper wire and fiber optics, including the wires that comprise a system bus coupled to the processor 412. Transmission media can also take the form of acoustic, electromagnetic, or light waves, such as those generated during RF, microwave, and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Various forms of computer readable media may be involved in carrying one or more sequences of one or more instructions to processor 412 (or any other processor of a device described herein) for execution. For example, the instructions may initially be borne on a magnetic disk of a remote computer (not shown). The remote computer can load the instructions into its dynamic memory and send the instructions over a telephone line using a modem. A modem local to the gaming device 410 may be operable to receive the data on the telephone line and use an infrared transmitter to convert the data to an infrared signal. An infrared detector can receive the data carried in the infrared signal and place the data on a system bus for processor 412. The system bus may carry the data to the main memory 440, from which processor 412 may retrieve data and execute instructions. The instructions received by main memory 440 may optionally be stored either before or after execution by processor 412. In addition, instructions may be received via communication port 418 as electrical, electromagnetic, and/or optical signals representing various types of information.

The memory 440 may also store at least one database 444. Database 444 may store data useful for implementing one or more embodiments described herein, such as: (i) a tournament database defining one or more open tournaments, including a start time, end time, rules for, eligible games and/or current status of respective tournaments; and/or (ii) a player database defining one more registered players and including an indication of which tournaments, if any, a particular player is participating in or registered for. In some embodiments, some or all of the data described herein as being stored in the database 444 may be partially or wholly stored (in addition to or in lieu of being stored in the memory 440 of the gaming device 410) in a memory of one or more other devices, such the online tournament server 260*a* and/or casino tournament server 260*b* of FIG. 2 herein, and/or a third party server (not shown), such as a cloud based server of a service with which processor 412 is operable to communicate.

In accordance with some embodiments, the processor 412 is operable to communicate with a display 416. The display 416 may comprise, for example, a display for displaying historical outcomes or other wagering information to players. In some embodiments, the display 416 may output a name of a player identified for a particular position, wager or activity, and whether a particular player is participating in a tournament such that his/her game play at the gaming device 410 is contributing towards his/her progress in the tournament. In some embodiments, the display 416 (or another display of the gaming device 410) may also or alternatively be operable to output information to a dealer, such as (i) prompts for how much should be collected from players in commission or losing wagers (e.g., for each player station 402*x-z* involved in the hand); (ii) prompts for how much should be paid out to players for winning wagers (e.g., for each player position involved in the hand); and/or (iii) other information regarding a status of the game, including information as to which players currently playing at the gaming device 410 are currently participating in an open tournament such that their play at the gaming device is being tracked and transmitted to another device operable to manage and/or facilitate the tournament. In some embodiments, the display 416 may include or have associated therewith its own processor, memory and program (and may be operable to communicate data to and/or from the processor 412). In some embodiments the display 416 may comprise, for example, one or more display screens or areas for outputting information related to game play on the gaming system, such as a CRT monitor, LCD screen, a LED screen, and/or a touch screen.

In some embodiments, the gaming device 410 may comprise an RFID-enabled smart table that is operable to read data from RFID wagering chips used on the table. Accordingly, in such embodiments the gaming device 410 may be equipped with one or more RFID-enabled antennas that read data from, or transmit data to, RFID-enabled wagering chips detected on the table. For example, an RFID-enabled chip tray may comprise one or more antennas for reading information from RFID-enabled chips placed in the chip tray. In such embodiments, the processor 412 is further operable to communicate with the one or more chip tray antenna(s) 414*a*. The one or more chip tray antenna(s) 414*a* may be operable to read data from one or more chips placed within a chip tray (e.g., chip identifier, chip set identifier, chip denomination, etc.) and transmit this information to the processor 412.

The processor 412 may, in some embodiments, be further operable to communicate with a plurality of antennas at player positions placed on the table. The gaming device 410 illustrates three (3) player positions 402*x-z* as each having at least one player position antenna or interrogation (X, Y and Z) associated therewith. Each such antenna X, Y and Z may be uniquely identifiable by, for example, (i) a unique identifier associated therewith, and (ii) an identification of a port or other component of the table associated with the antenna (e.g., the port into which the antenna is plugged into may have a unique identifier associated therewith) and such unique antenna identifier may be transmitted to or recognized by the processor 412 when chip information regarding a chip acquired by a respective antenna is transmitted to the processor 412, such that the processor 412 may be programmed to determine information such as which player position and which betting area within the player position 402*x-z* the chip has been placed within. In some embodiments, a single player station 402*x* may include interrogators associated with two or more players. For example, one interrogator may be intended for a first player playing the game at the table and another interrogator for a second player (e.g., a "back bettor") who may be betting along with or in association with the first player, either remotely or from essentially the same location, but whose chips and betting activity is to be separately tracked. In some embodiments, a chip status database (e.g., database 444) may be part of the system and store detailed data with information regarding chips which have been identified (e.g., by a remote server device) as selected chips and utilize the information in this database 444 to determine whether any of the chips detected at the table comprise selected chips identified in the database 444.

According to some embodiments, the processor 412 may be operable to communicate with an electronic shoe 422. The shoe 422 may be an intelligent shoe such as the IS-T1™ and IS-B1™ or the MD1, MD2 sold by Shuffle Master® or other such devices. The shoe 422 may be able to determine which cards are being dealt to which player station, through RFID technology, image recognition, a printed code on the card (such as a barcode), or the like. The embodiments described herein are not dependent on any particular technique used to recognize cards dealt in a card game (or cards remaining as available to be dealt). Further information about intelligent shoes may be found in U.S. Pat. Nos. 5,941,769 and 7,029,009, both of which are incorporated by reference in their entireties and U.S. Patent Application Publications 2005/0026681; 2001/7862227; 2005/0051955; 2005/0113166; 2005/0219200; 2004/0207156; and 2005/0062226 all of which are incorporated by reference in their entireties. In place of an intelligent shoe 422, cameras may be used with pattern recognition software to detect what cards have been dealt to what player stations and what chips have been wagered at particular player stations 402*x-z*. One method for reading data from playing cards at table games is taught by German Patent Application No. P44 39 502.7. Other methods are taught by U.S. Patent Application Publication 2007/0052167 both of which are incorporated by reference in their entirety. In some embodiments, the gaming device 410 may comprise an electronic table in which virtual representations of cards are dealt rather than physical cards. In such embodiments, an electronic shoe 422 may not be desired and each player station 40*ax-z* may include a respective electronic display for displaying the electronic cards dealt to a player.

In some embodiments, the processor 412 may be operable to communicate with a dealer station antenna 414*b*, which comprises one or more antennas placed in a dealer area of the corresponding table. The dealer station antenna 414*b* may be operable to detect RFID-enabled chips which have been placed within its acquisition area, such as chips the dealer places in the area for recognizing by the system prior to placing them into the dealer tray or paying them to a player.

In accordance with some embodiments, the gaming device 410 may be operable to identify game data such as wagers placed, cards dealt, results of hands based on cards dealt, payouts provided to players and/or wagers or commissions collected from players, via the various sensors or antennas comprising the table, the data being processed through and/or processed by the processor 412. This game play data, or results of the analysis, may then be transmitted to another device. For example, for players who are determined to be registered for a currently open tournament such that the game play data or results of the players game play at the gaming device 410 contribute towards the player's progress in the open tournament, the game play data or results may be transmitted from the gaming device 410 to another device tasked with managing the tournament. In some embodiments, such as in the case that a local/in-casino player at the gaming device 410 is continuing a tournament (and/or game), the gaming device 410 may download and/or retrieve information from the tournament management server such as the player's score, standing, rank, available and/or earned perks, etc.

Fewer or more components 402*x-z*, 412, 414*a-b*, 418, 422, 440, 442, 444 and/or various configurations of the depicted components 402*x-z*, 412, 414*a-b*, 418, 422, 440, 442, 444 may be included in the gaming device 410 without deviating from the scope of embodiments described herein. In some embodiments, the components 402*x-z*, 412, 414*a-b*, 418, 422, 440, 442, 444 may be similar in configuration and/or functionality to similarly named and/or numbered components as described herein. In some embodiments, the gaming device 410 (and/or portion thereof) may comprise a combined online and in-casino wagering game tournament program, system, and/or platform programmed and/or otherwise configured to execute, conduct, and/or facilitate the methods 600, 700 of FIG. 6 and/or FIG. 7 herein, and/or portions or combinations thereof.

Figure 5:
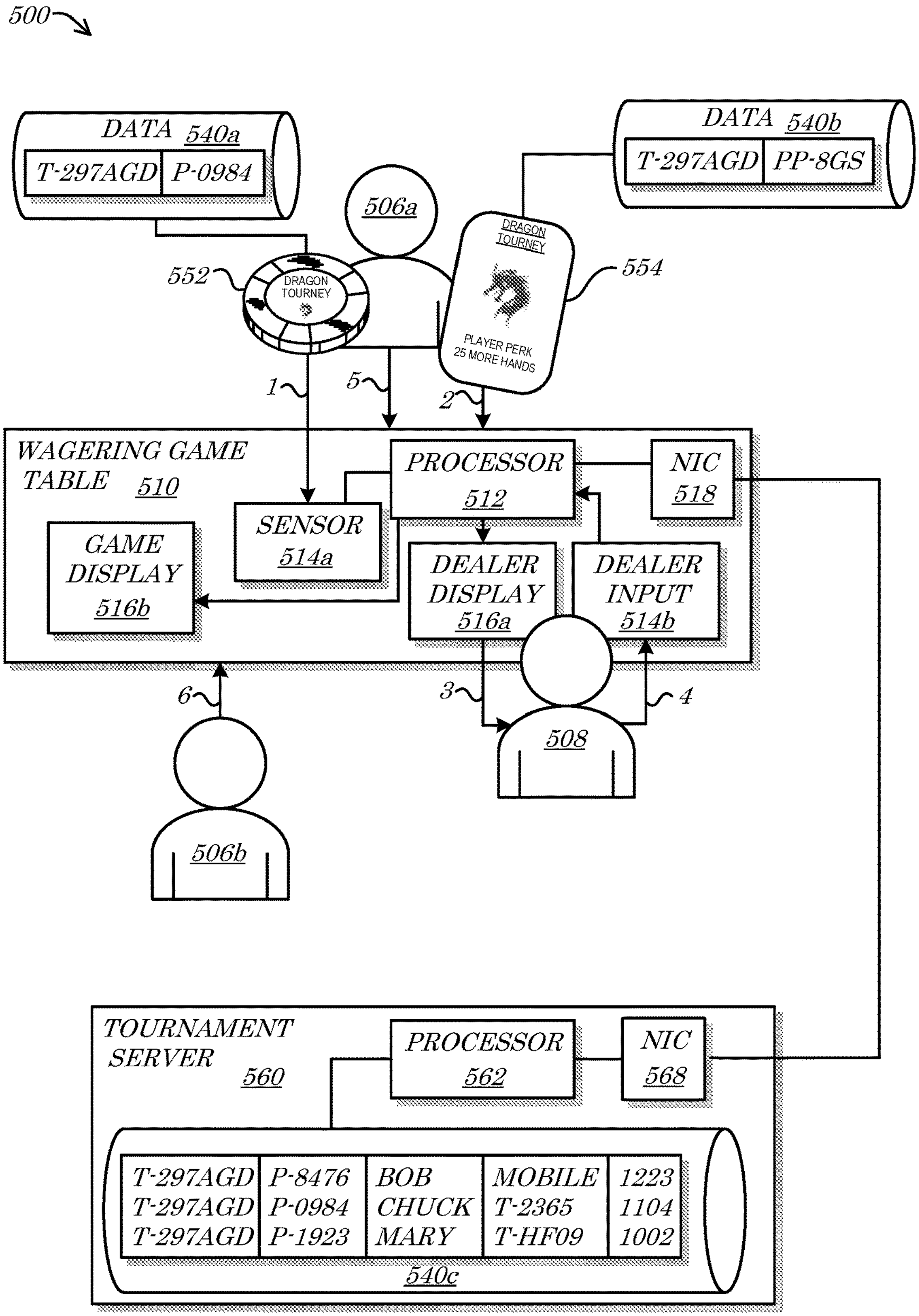
FIG. 5 is a block diagram of a system according to some embodiments.

Turning now to FIG. 5, a block diagram of a system 500 according to some embodiments is shown. The system 500 may comprise, for example, a system for conducting a wagering game (e.g., in a casino and/or other physical gaming establishment) in which different players 506*a-b* are able to participate while a first player 506*a* is also able to utilize the game play to participate in at least one combined and/or hybrid online and in-casino tournament, as described herein. In some embodiments, the system 500 may comprise a dealer 508 (and/or other casino and/or wagering game personnel) that manages the wagering game at an electronic gaming table 510 (and/or other electrical, mechanical, electro-mechanical, and/or electronic-enabled or enhanced physical wagering game device). The electronic gaming table 510 may, for example, comprise an electronic or "smart" poker, baccarat, craps, blackjack, roulette, and/or other card-based, token-based, and/or otherwise physically-based wagering game. According to some embodiments, the electronic gaming table 510 may comprise an electronic processing device or "processor" 512 in communication with one or more of a sensor 514*a*, a dealer input device 514*b*, a dealer display 516*a*, a game display 516*b*, and/or a NIC 518. In some modes of operation and/or in some instances, the electronic gaming table 510 and/or the dealer 508 may conduct the wagering game session by accepting gaming session input from the players 506*a-b* (e.g., wagers and/or game play decisions, choices, and/or selections), identifying a random gaming session input (e.g., output from an RNG and/or a randomly drawn playing card or randomly disposed gaming element such as a roulette ball landing in a certain spot), resolving a gaming session outcome based on the random gaming session input (e.g., by applying at least one gaming outcome rule), and resolving a gaming session result based on the gaming session outcome (e.g., by applying at least one gaming result rule). The gaming session result may be resolved and/or defined for the electronic gaming table 510 as a whole (e.g., for all players 506*a-b*) and/or for individual players 506*a-b*.

According to some embodiments, data descriptive of the various gaming session inputs, events, metrics, outcomes, results, etc. may be monitored, tracked, and/or stored in one or more data storage devices 540*a-c*. In some embodiments, such data may be stored by the electronic gaming table 510 and/or by a player loyalty or rewards server (not shown) such as for auditing, regulatory compliance, and/or player loyalty/rewards purposes as is known in the art. According to some embodiments, such data may also or alternatively be monitored, tracked, and/or stored in coordination with and/or furtherance of a combined and/or hybrid online and in-casino tournament.

In some embodiments, the first player 506*a* may be identified by the electronic gaming table 510 (and/or by the dealer 508) as a participant in the tournament (e.g., while a second player 508*b* may be identified as a non-tournament or "regular" player). The first player 506*a* may provide a code, pass phrase, and/or identifier to the dealer 508, for example, and the dealer 508 may enter the received information into the dealer input device 514*b*. In some embodiments, the electronic gaming table 510 may detect, decode, and/or otherwise identify such input from the first player 506*a* without assistance from the dealer 508 (e.g., "automatically"). According to some embodiments, such as depicted in FIG. 5, The first player 506*a* may provide a tournament token 552 to the electronic gaming table 510, at "1". The tournament token 552 may, for example, comprise human and/or computer-readable indicia (e.g., images, words, characters, barcodes, etc.) and/or store information indicative of the tournament and/or the first player 506*a*. As depicted in FIG. 5, in some embodiments the tournament token 552 may comprise an RFID and/or other short-range wireless communication-enabled "smart" chip that stores one or more data elements in a first data storage device, memory, or data 540*a*.

According to some embodiments, the first data 540*a* may comprise a stored indication of a tournament identifier (e.g., "T-297AGD"), a player identifier (e.g., "P-8476"), and/or other game, casino, tournament, and/or player information. The player identifier may, in some embodiments, be descriptive of the first player 506*a*. The first player 506*a* may, for example, register for the tournament and the first data 540*a* of the tournament token 552 may be defined (e.g., written, downloaded, edited, etc.) during the registration process and/or as the tournament token 552 is provided to the first player 506*a* (e.g., at a casino customer service and/or tournament registration window, service counter, kiosk, etc.; not shown). According to some embodiments, the tournament token 552 may only indicate (e.g., on an outside surface thereof) and/or store (e.g., in the first data 540*a*) an identifier of the tournament.

In some embodiments, the sensor 514*a* (e.g., one or more RFID antennas) may detect the presence and/or placement of the tournament token 552 and may interrogate, read, and/or otherwise acquire or receive the first data 540*a*. According to some embodiments, the processor 512 may cause the NIC 518 to send a signal to a tournament server 560 to notify the tournament server 560 that the first player 506*a* has been seated at the electronic gaming table 510 and/or as a request to verify and/or authenticate the participation of the first player 506*a* in the tournament. In some embodiments, the processor 512 may cause the dealer display 516*a* (and/or the game display 516*b*) to output an indication of the participation of the first player 506*a* in the tournament. The first player 506*a* may be flagged or indicated via the displays 516*a-b* and/or in one or more of the data storage device 540*a-c*, for example, a participant of the tournament. In some embodiments, this flagging and/or indication descriptive of the tournament participation may cause data descriptive of the gaming session to be monitored, tracked, and/or recorded or stored by the electronic gaming table 510. According to some embodiments, the conducted flagging and/or indication descriptive of the tournament participation may cause the gaming session to be conducted in a manner that differs from an ordinary or default manner or mode of operation.

While play of the gaming session may normally be conducted (e.g., by the electronic gaming table 510 and/or the dealer 508) in accordance with the at least one gaming outcome rule and the at least one gaming result rule for all players 506*a-b*, for example, in the case that the first player 506*a* is identified as a participant of the tournament the gaming session may be conducted (e.g., by the electronic gaming table 510 and/or the dealer 508) in accordance with the at least one tournament rule (e.g., applicable to all players 506*a-b* or just to the first player 506*a*). In some embodiments, the at least one tournament rule may be utilized as a replacement for a default or standard outcome or result computation rule and/or may be utilized in place of a default or standard outcome or result rule to conduct the gaming session at the electronic gaming table 510 in accordance with the participation of the first player 506*a* in the tournament.

According to some embodiments, the tournament rule may be retrieved and/or received from the tournament server 560. The NIC 518 of the electronic gaming table 510 may send a signal to the tournament server 560 indicating that the first player 506*a* is participating in the gaming session at the electronic gaming table 510, for example, and a server processor 562 may receive the indication from a connected server NIC 568. The server processor 562 may retrieve information stored in association with the first player 506*a* from a database 540*c* (e.g., a third data storage device) and transmit a response back to the electronic gaming table 510 that may, for example, include an indication of an authentication of the first player 506*a*, an indication of the tournament (e.g., name, start time, end time, etc.), and/or an indication of the tournament rule (e.g., a modifier, benefit, etc., for the first player 506*a*).

In some embodiments, a tournament rule, modifier, and/or "perk" may be identified based on input provided by the first player 506*a*, at "2". In addition to the tournament token 552 provided at "1", that verifies the participation of the first player 506*a* in the tournament for example, the first player 506*a* may provide a code, voucher, and/or tournament perk card 554. According to some embodiments, the tournament perk card 554 may comprise a physical card (or token or other object) that comprises a human and/or computer-readable indicia of a particular tournament rule. In some embodiments, the tournament perk card 554 may comprise a visual human-readable indica of a particular rule or "perk" that is viewed by the dealer 508. According to some embodiments, the electronic gaming table 510 (e.g., the sensor 514*a*) may detect and/or read the tournament perk card 554 and the processor 512 may cause the NIC 518 to communicate with the tournament server 560 to verify and/or authenticate the tournament perk card 554 and/or retrieve an indication of the particular perk/rule. In some embodiments, a response to the verification/authentication may be provided to the dealer 508 via the dealer display 516*a*, at "3". In some embodiments, the dealer 508 may also or alternatively enter information into the dealer input device 514*b* (at "4") that is descriptive of the tournament perk card 554 and the processor 512 may cause the NIC 518 to communicate with the tournament server 560 to verify and/or authenticate the tournament perk card 554 and/or retrieve an indication of the particular perk/rule. In some embodiments, a response to the verification/authentication may be provided to the dealer 508 via the dealer display 516*a* (e.g., at "3"). In some embodiments, the tournament perk card 554 may store, in a second data storage device, memory, or data 540*b*, an indication of the tournament, player, tournament rule/perk, etc. The tournament perk card 554 may, for example, comprise an RFID-enabled card that provides the second data 540*b* to the electronic gaming table 510.

According to some embodiments, the electronic gaming table 510 may be utilized to conduct the gaming session by receiving input from the players 506*a-b*. The first player 506*a* may provide first gaming session input at "5", for example, and/or the second player 506*b* may provide second gaming session input at "6". The gaming session input may comprise one or more indications of wagers, game moves, plays, selections, choices, etc., that are applicable to the particular type and/or style of wagering game being conducted at and/or by the electronic gaming table 510. In some embodiments, the first gaming session input from the first player 506*a* may be utilized in conjunction with random gaming session input (such as output from an RNG and/or a randomly drawn card) and the gaming outcome and gaming result rules to determine a first result of the wagering game for the first player 506*a*. According to some embodiments, the first result may also or alternatively be computed (e.g., calculated, looked up, and/or logically determined) utilizing the tournament rule/perk identified by the tournament perk card 554. In some embodiments, the second gaming session input from the second player 506*b* may be utilized in conjunction with random gaming session input (such as output from an RNG and/or a randomly drawn card) and the gaming outcome and gaming result rules to determine a second result of the wagering game for the second player 506*b*. According to some embodiments, such as in the case that the second player 506*b* is not a tournament participant, the first result may be based on (or influenced by) the tournament rule/perk while the second result may not be based on or take into account the tournament rule/perk. The gaming session of the second player 506*b* may not, for example, be influenced or affected by the participation of the first player 506*a* in the tournament.

In some embodiments, various data descriptive of the participation of the first player 506*a* in the gaming session may be transmitted by the electronic gaming table 510 to the tournament server 560. The tournament server 560 may, for example, aggregate, collect, retrieve, and/or receive wagering game session results for a plurality of tournament players (such as the first player 506*a*; others not shown) and/or store such data in the database 540*c*. According to some embodiments, the data stored in the database 540*c* may be utilized by the tournament server 560 to define, create, generate, calculate, compute, and/or otherwise derive or determine a leader board for the tournament. In some embodiments, the leader board (e.g., an indication thereof) may be transmitted by the server NIC 568 to (and accordingly received by) the NIC 518 of the electronic gaming table 510. According to some embodiments, the electronic gaming table 510 (e.g., the processor 512 thereof) may cause a graphical (e.g., image-based) representation of the leader board for the tournament to be output to the players 506*a-b* via the game display 516*b*. In such a manner, for example, the second player 506*b* may become aware of the participation of the first player 506*a* in the tournament and/or may witness benefits received by the first player 506*a* via the tournament rule(s)/perk(s) applied to the wagering game at the electronic gaming table 510, and may be incentivized to register for the tournament (and/or a different/future tournament) as well.

Fewer or more components 506*a-b*, 508, 510, 512, 514*a-b*, 516*a-b*, 518, 540*a-c*, 552, 554, 560, 562, 568 and/or various configurations of the depicted components 506*a-b*, 508, 510, 512, 514*a-b*, 516*a-b*, 518, 540*a-c*, 552, 554, 560, 562, 568 may be included in the system 500 without deviating from the scope of embodiments described herein. In some embodiments, the components 506*a-b*, 508, 510, 512, 514*a-b*, 516*a-b*, 518, 540*a-c*, 552, 554, 560, 562, 568 may be similar in configuration and/or functionality to similarly named and/or numbered components as described herein. In some embodiments, the system 500 (and/or portion thereof) may comprise a combined online and in-casino wagering game tournament program, system, and/or platform programmed and/or otherwise configured to execute, conduct, and/or facilitate the methods 600, 700 of FIG. 6 and/or FIG. 7 herein, and/or portions or combinations thereof.

IV. Online and In-Casino Wagering Game Tournament Methods

Figure 6:
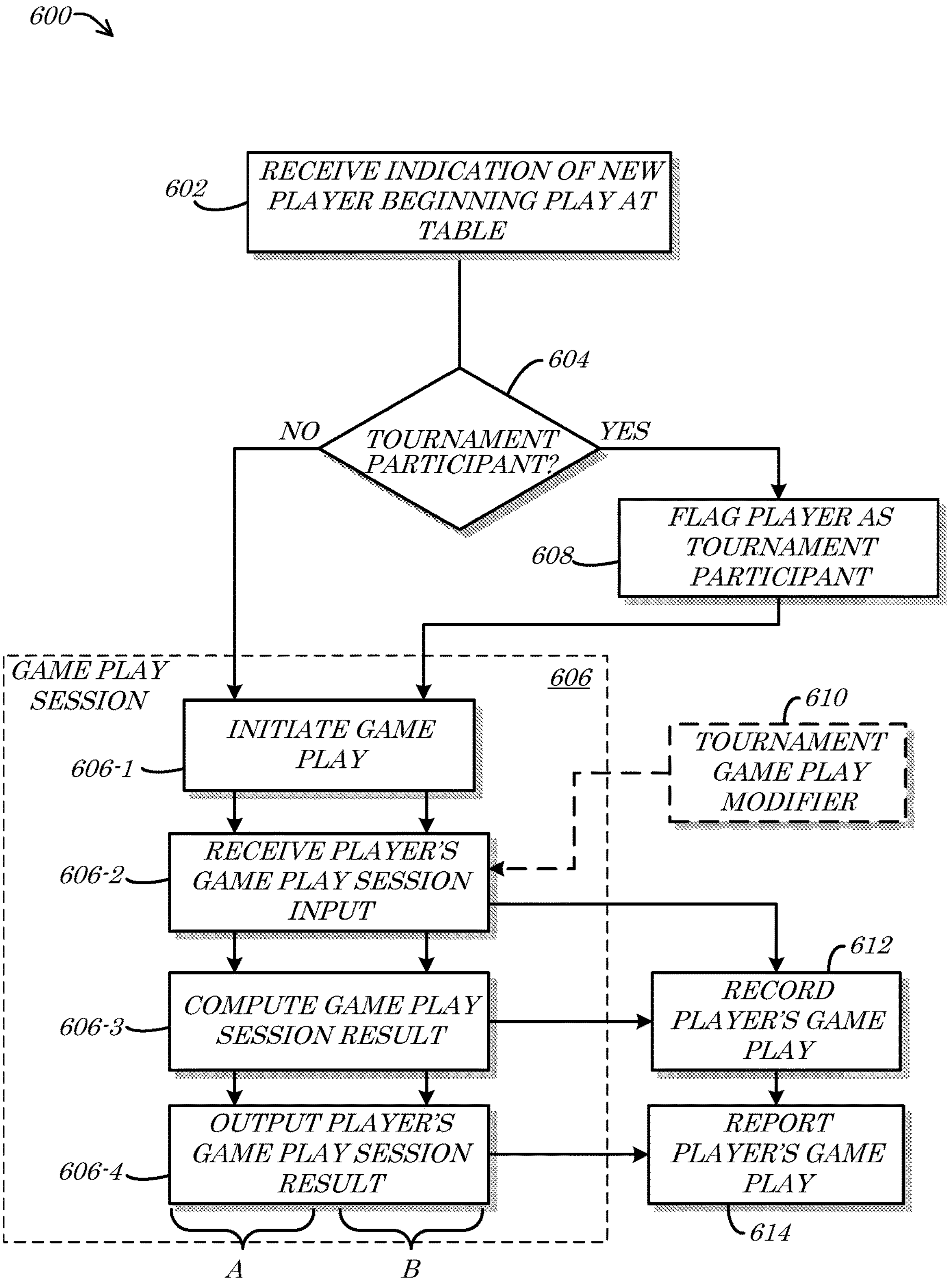
FIG. 6 is a flow diagram of a method according to some embodiments.

Referring now to FIG. 6, a flowchart of a method 600 according to some embodiments is shown. It should be noted that the method 600 is exemplary only and should not be construed in a limiting fashion. For example, additional and/or substitute steps, processes, features, and/or relationships or actions to those illustrated may be practiced within the scope of one or more embodiments and/or one or more steps, processes, features, and/or relationships or actions may be omitted or modified. In some embodiments, the method 600 may be performed by a gaming device, although some or all of the process steps, actions, and/or processes may in some embodiments be performed by other devices (e.g., casino tournament server 260*a* and/or online tournament server 260*b* of FIG. 2 herein).

Figure 9A:
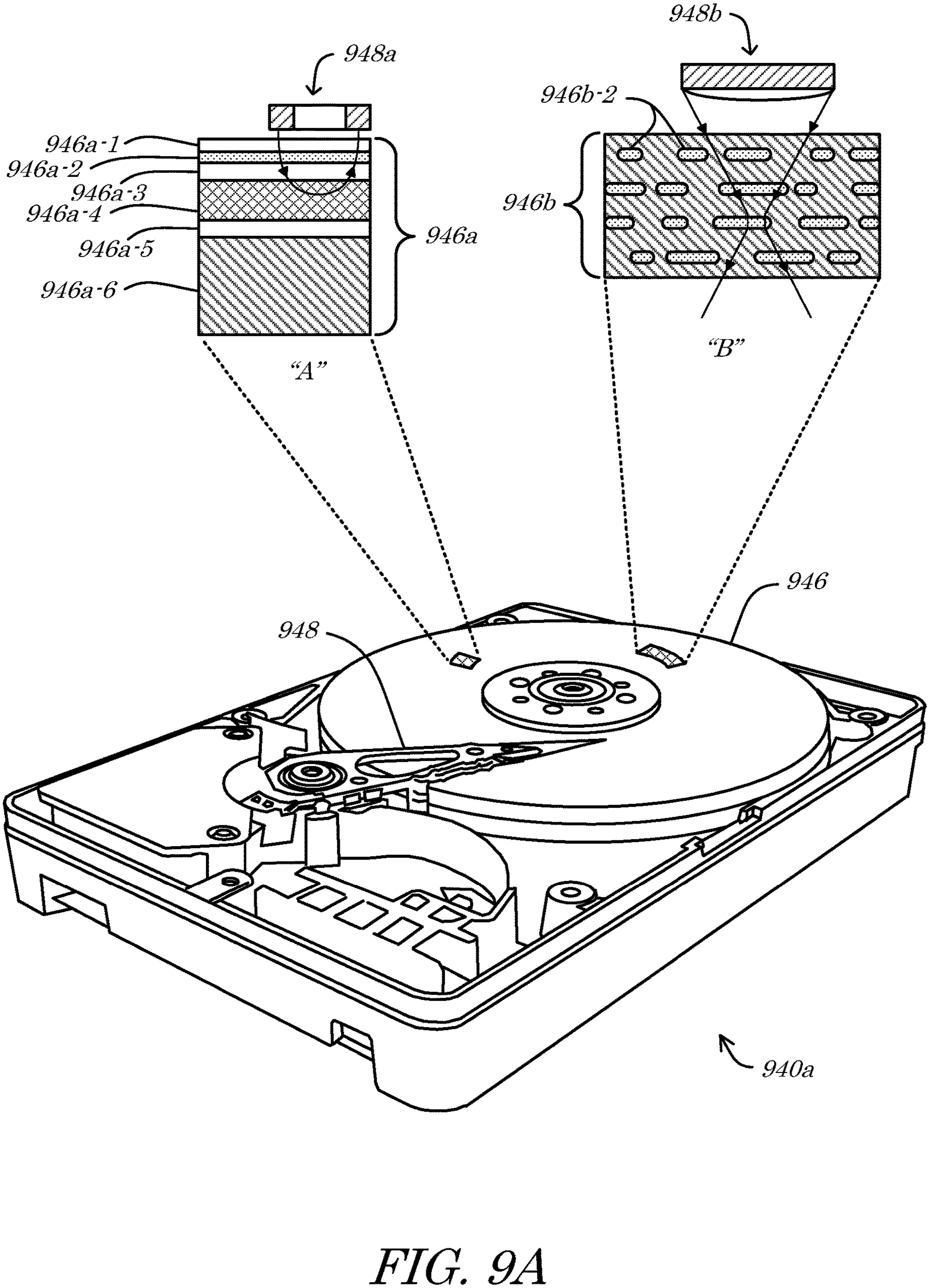
FIG. 9A, FIG. 9B, FIG. 9C, FIG. 9D, and FIG. 9E are perspective diagrams of exemplary data storage devices according to some embodiments.
Figure 9B:
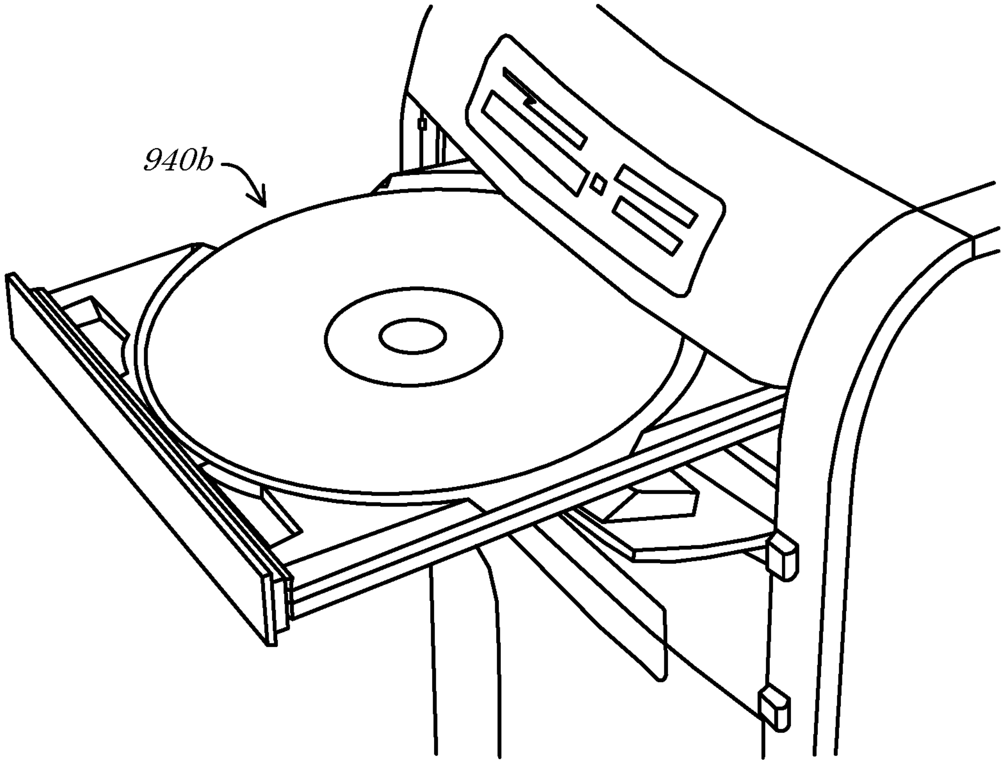
Figure 9C:
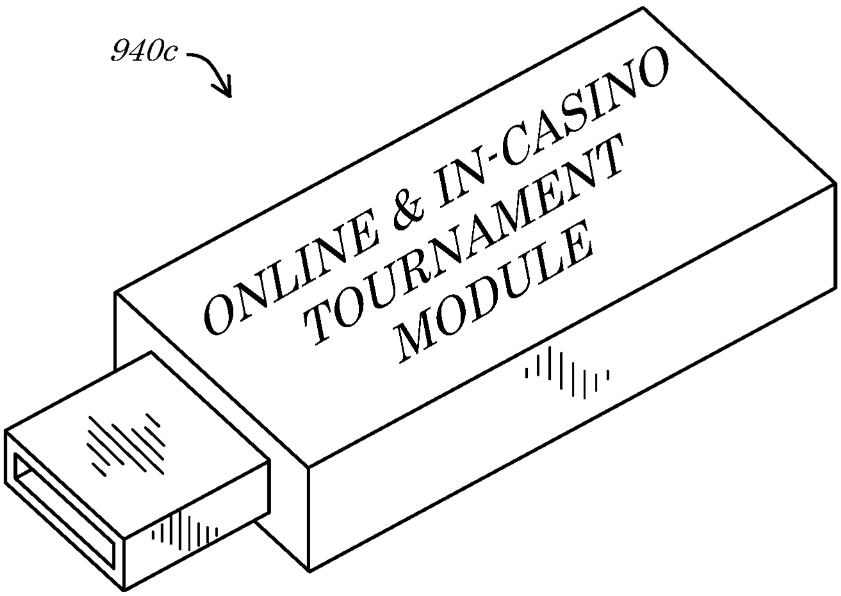
Figure 9D:
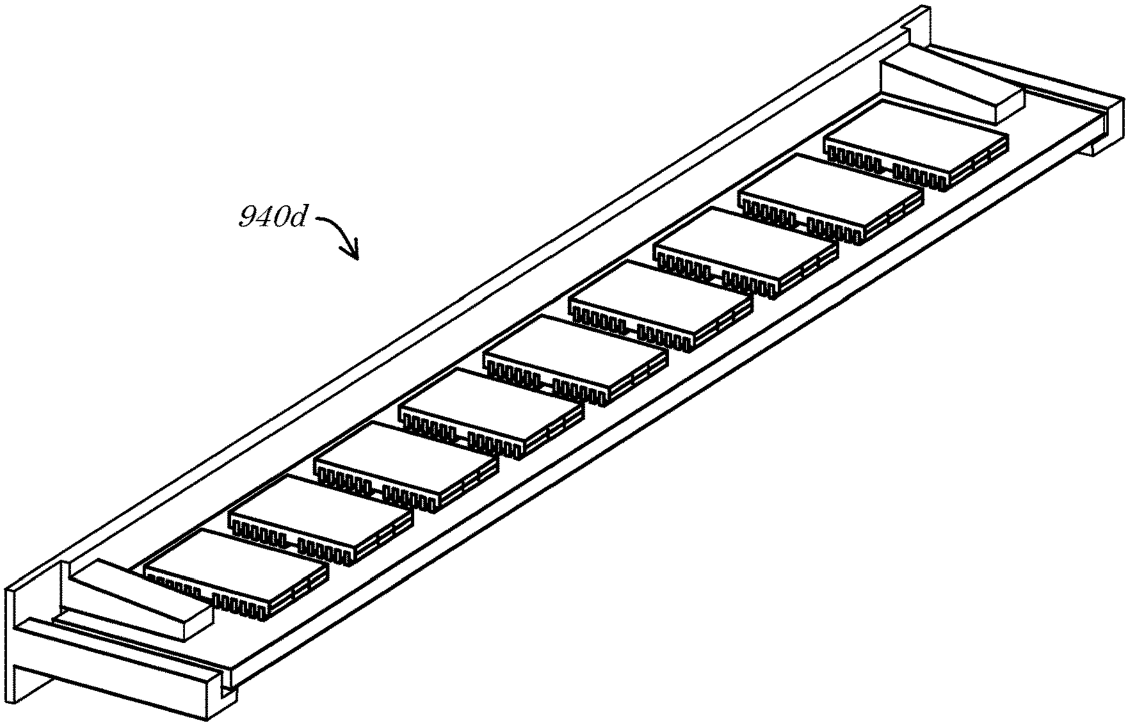
Figure 9E:
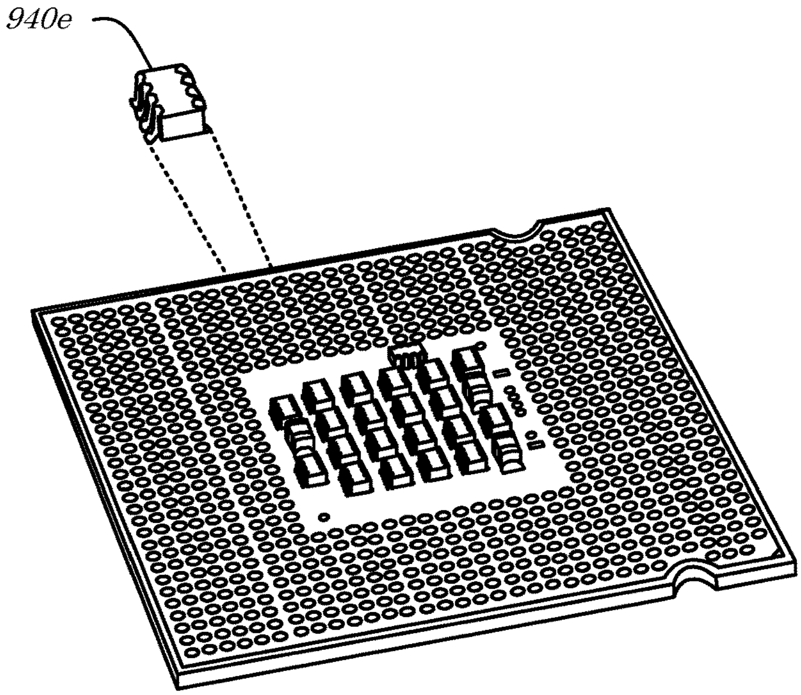

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, RAM device, cache memory device, Universal Serial Bus (USB) mass storage device, and/or DVD; e.g., the memory/data storage devices 140, 340, 440, 540*a-c*, 840, 940*a-e* of FIG. 1, FIG. 3, FIG. 4, FIG. 5, FIG. 8, FIG. 9A, FIG. 9B, FIG. 9C, FIG. 9D, and/or FIG. 9E herein) may store thereon instructions that when executed by a machine (such as a computerized processor) result in performance according to any one or more of the embodiments described herein.

In some embodiments, the method 600 may comprise receiving (e.g., by an electronic processing device and/or from an RFID token) an indication of a new player beginning play at a gaming table/device, at 602. The indication of the player beginning game play at the gaming device may be received electronically, for example, and/or otherwise determined. In some embodiments, a player may provide a player identifier (e.g., a slot club player card) or simply sit down and begin playing at a player station that was previously unoccupied. In one embodiment, a gaming device comprising an RFID-enabled smart table may be operable to identify a player based on the wagering chips the player places on the table. For example, an RFID antenna at the player position may detect one or more wagering chips being placed at the player position. In some embodiments, the player may be identified based on such detected player chips because RFID-enabled chips may correspond to respective unique chip identifiers which are associated with a player identifier of the player who currently owns the chips. In some embodiments, a dealer may provide an indication to the system that a new player has bought in or is beginning play at the gaming device (e.g., by actuating a button or interface mechanism of the gaming device). In one embodiment in which the gaming device comprises a slot machine or other electronic device, a new player initiating play on the gaming device may be prompted to input an identifier prior to beginning play by, for example, providing a code or identifier to an appropriate input mechanism of the gaming device (e.g., QR code, bar code, magnetic strip, NFC signal, RFID signal or other form of input into an appropriate reader of the gaming device).

According to some embodiments, the method 600 may comprise determining whether the new player is a tournament participant, at 604. Once the new player who has begun play at the gaming device is identified, it is determined, for example, whether the player is registered as a participant in a tournament that is currently open (i.e., a tournament for which game play results are currently being accepted in order to determine the winners of the tournament and progress of the tournament). In some embodiments, a tournament administrator may store an indication of each player who registers for a given tournament in a record of a database or other memory, such that the players status as a registered participant is stored and accessible for subsequent verification by the system (e.g., an identifier or other indicator of the tournament the player has registered for is stored in association with a player identifier of the player). In some embodiments, a player who registers for a tournament may be provided with a code or credentials (e.g., a QR or bar code, a passcode, a username, password or other unique identifier that indicates to the system the players registration as a participant in a particular tournament), which the player may subsequently provide to a gaming device or user mobile device (e.g., via an app the user may use to participate online in the tournament) in order to indicate the players registration in the tournament such that the player's game play is tracked and acknowledged by the system for purposes of tracking the players participation in the tournament.

In some embodiments, any player who has registered as a participant in a tournament and would like to have his/her current game play count towards progress in the tournament may provide identifying information that allows the system to identify the player and verify that the player is registered for an open tournament (i.e., a tournament that is currently in progress such that the game play of players registered for the tournament may be counted towards measuring or determining the players' progress or status in the tournament). For example, the player may provide his/her player identifier to a gaming device or dealer when beginning play, which the system may then utilize to verify whether the player is currently registered for a tournament (e.g., by transmitting the player identifier to a casino tournament server, having the casino tournament server look up in a database or other memory mechanism whether the player is registered for a tournament and receiving a response from the casino tournament server). In some embodiments, the player may tell the dealer that he/she is registered for a tournament, which may cause the dealer to actuate a subroutine or process for the player that transmits that player's game play results to the casino tournament server. In some embodiments, a player may provide a code corresponding to the tournament for which he is registered, thus allowing the system to verify that the player is registered for the tournament. According to some embodiments, the player's status as a tournament participant may be automatically determined by a reading of a tournament token or chip provided by the player (e.g., placed on the gaming table in the physical casino).

In some embodiments, the method 600 may include an additional step, after it is determined that the player is registered as a participant for a tournament, of determining whether that tournament is currently open. For example, the current time may be compared to the tournament start time and end time to confirm that the current time is between the start time and the end time. In another example, the gaming device may communicate with a casino tournament server to request an indication of whether the tournament for which the player is registered is currently open.

If it is determined that the player is registered for a tournament that is currently open, the gaming device may, throughout the player's play at the gaming device, follow a mode or subroutine in which game play data for the player (e.g., the game play results, such as the outcomes of hands or game plays on which the player wagers, wager amounts and/or payout amounts) are transmitted to the casino tournament server or another device operable to manage the tournament. In the case that any player at the gaming table/machine is determined not to be a tournament participant, for example, the method 600 may continue by allowing or enabling the player to participate in a game play session, at 606. In some embodiments, this non-tournament player game session may be conducted utilizing a first or standard rule set, pay table, etc. According to some embodiments, the progress and/or actions or results of the non-tournament player game session may not be tracked or recorded by the gaming table and/or system (e.g., non-tournament players may simply play an in-casino game of baccarat at a baccarat table or may simply play an online slots wagering game, as they normally would), e.g., pursuant to a first game play track "A". According to some embodiments, in the case that it is determined that a player is a tournament participant, the method 600 may comprise flagging the player as a tournament participant, at 608.

According to some embodiments, the game play session 606 may comprise various actions within the method 600. The method 600 and/or the game play session 606 may comprise, for example, initiating game play, at 606-1. All players, whether tournament or regular players for example, may be prompted to place wagers and/or otherwise take actions that initiate play of the chosen wagering game. In some embodiments, the method 600 and/or the game play session 606 may comprise receiving each player's game play input (e.g., wagers, selections, choices, moves), at 606-2. In some embodiments, the method 600 may comprise receiving or otherwise identifying a tournament game play modifier, at 610. Tournament players may have or earn special perks, for example, that modify the game play session 606, at least for themselves. Perks/modifiers associated with and/or assigned to each particular tournament player may be looked up and/or retrieved from a central database, for example, to utilize in the game play session 606. According to some embodiments, a player may provide or play a tournament perk card that provides an indication of the particular perk and which can be authenticated (e.g., based on computer and/or human-readable indicia thereof) to verify the players ability to utilize the perk.

In some embodiments, for players that are flagged as tournament participants in the gaming system (e.g., at the gaming table in the casino and/or in an online session) the game play session 606 may be conducted such that one or more actions, status, result, and/or outcome of the player is recorded, monitored, and/or provided (e.g., externally from the game device), e.g., pursuant to a second game play track "B", and/or at 612. According to some embodiments, the game play data may be transmitted along with an identifier that allows the casino tournament server to store and process the game play results for the appropriate tournament (e.g., the game play data may be transmitted along with the player identifier, which the casino tournament server may recognize as being registered for a particular tournament and thus store the game play results in a record of that tournament, and/or along with an identifier of the tournament), at 614.

According to some embodiments, the method 600 and/or the game play session 606 may comprise computing (e.g., by the electronic processing device and/or utilizing a Random Number Generator (RNG)), one or more game play session results, at 606-3. For players that have activated, triggered, and/or played tournament perks, such perks may be taken into account when resolving the session results. In some embodiments, the method 600 and/or the game play session 606 may comprise outputting the player's results (some or all) for the game play session, at 606-4.

Thus, as can be appreciated from method 600, it may be the case that at a given gaming device operable to support game play of a plurality of players (e.g., an electronic table or a multi-player slot machine), some players currently playing at the gaming device may be playing while participating in different tournaments while other players may be playing while not participating in a tournament. Similarly, players may readily switch from playing in-casino games to online games (or vice versa) while maintaining the ability to continue to participate in the same tournament. This permits, for example, more flexibility on the part of the player to travel, return home, and/or otherwise enter or leave the casino, without taking away from the tournament experience.

Figure 7:
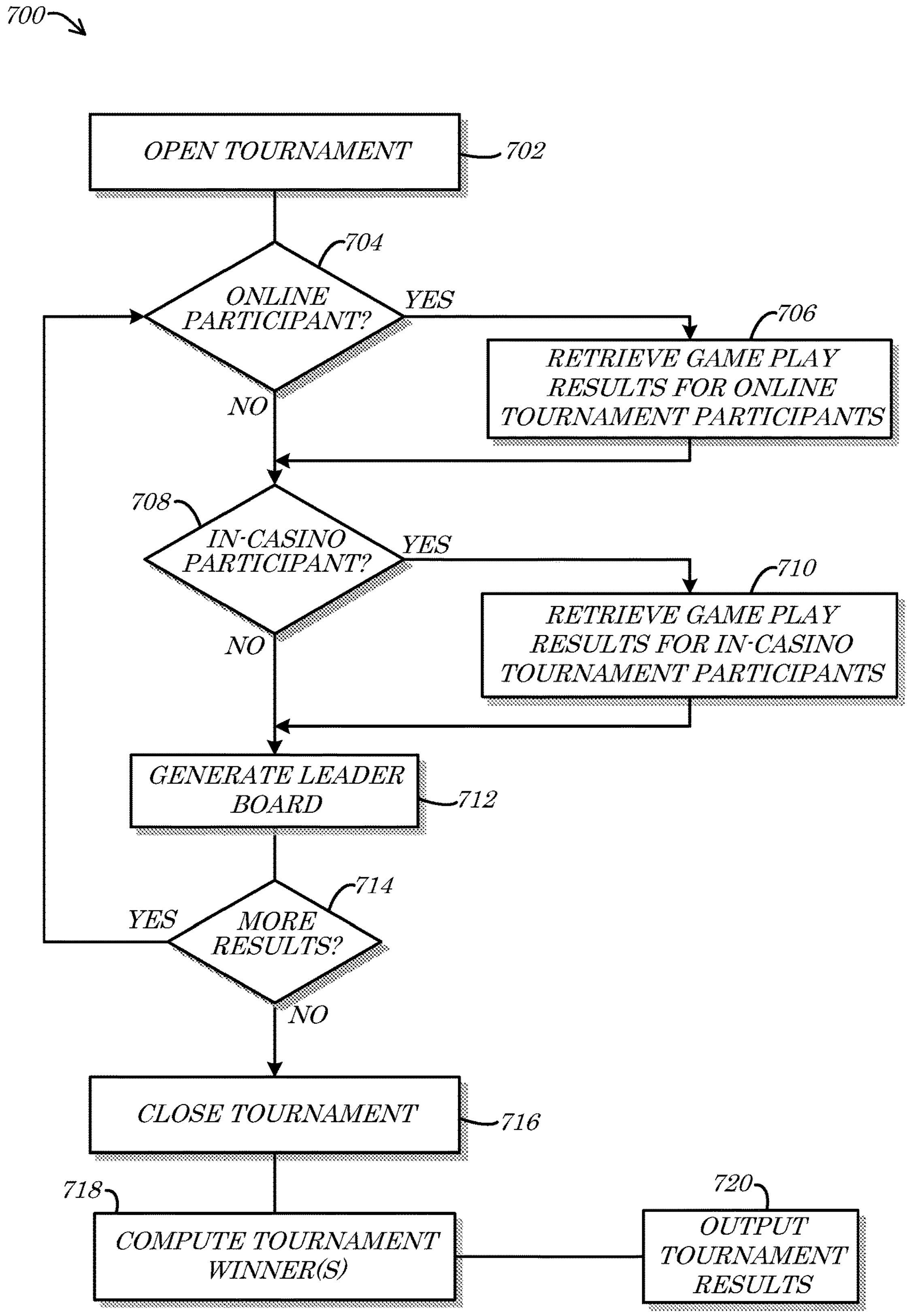
FIG. 7 is a flow diagram of a method according to some embodiments.
Figure 8:
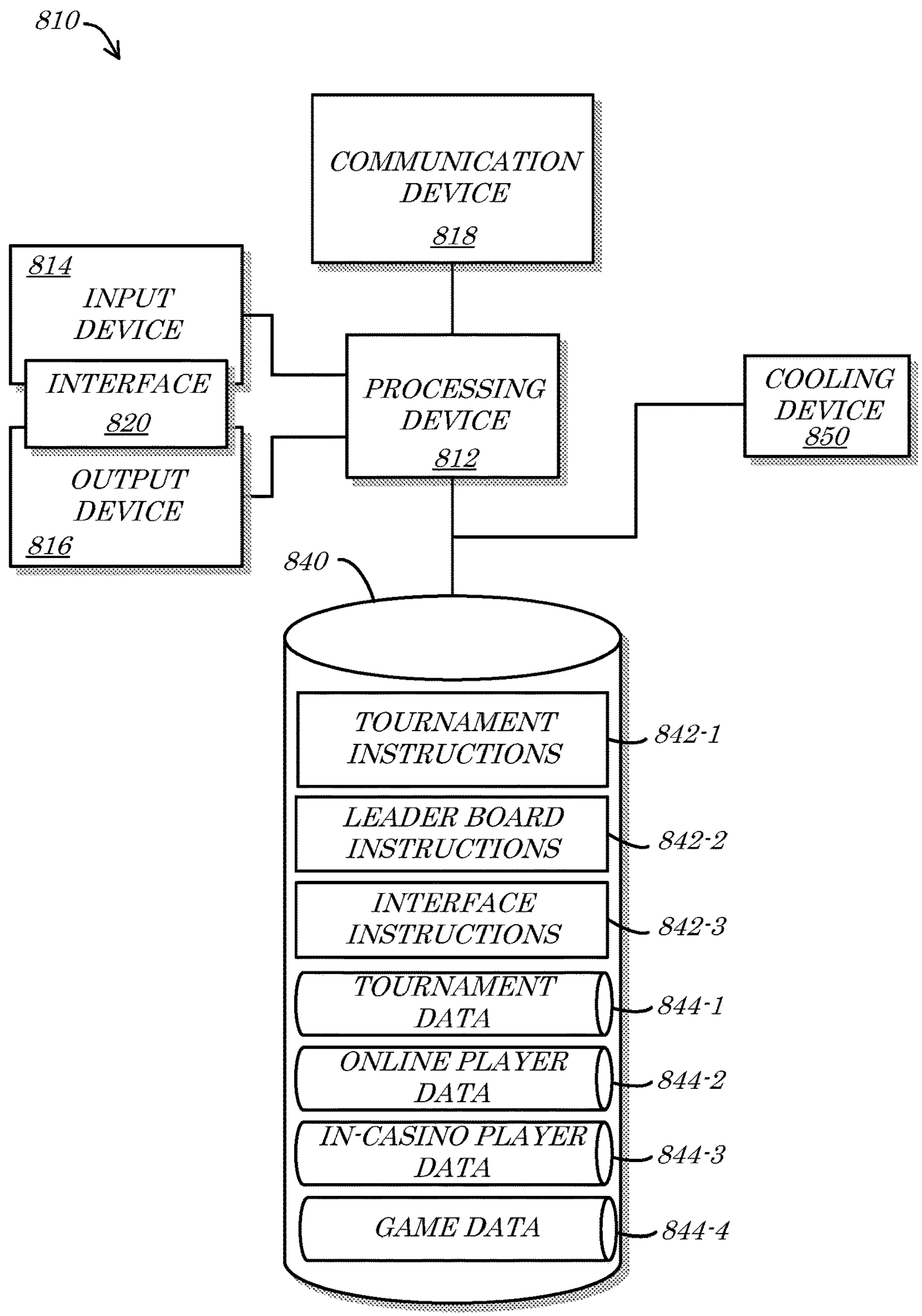
FIG. 8 is a block diagram of an apparatus according to some embodiments.

Referring now to FIG. 7, a method 700 according to some embodiments is shown. The method 700 may be performed by, for example, a casino and/or online tournament server or another device tasked with processing game play results of players registered for a tournament and determining the winner(s) of the tournament. As described herein, in accordance with various embodiments a player may register to participate in a wagering game tournament and participate in the tournament by playing the eligible wagering game(s) at physical gaming devices or tables at a brick and mortar casino, online (e.g., via an approved app on the users mobile device) or a combination of the foregoing. For example, the player may register to participate in a tournament consisting of two hundred (200) hands of baccarat to be played between time X on Day A (start time of the tournament) and time Y on Day B (end time of the tournament) and may play some of those two hundred (200) hands of baccarat at one or more physical baccarat tables of a brick and mortar casino (or physical tables of more than one brick and mortar casino if more than one casino location is participating in the tournament), one or more games online via a designated app on the players mobile device, or a combination thereof. So long as those two hundred (200) hands are completed between the start time and end time of the tournament (and embodiments herein are implemented), they will be recognized by the system as part of the player's participation in the tournament and utilized towards determining winner(s) of the tournament. Thus, multiple players can participate in the tournament from different locations (whether physical locations at brick and mortar casinos or remote locations at which the games are played online).

In some embodiments, a participating player may be provided with a code or credentials to enter (e.g., in to an approved app of a mobile device or to a gaming device or dealer at a casino) prior to beginning game play the player would like to have counted towards his participation in the tournament, such that the game play will be tracked and stored in association with the appropriate tournament for which the player has registered. For example, the game play results for such game play may be transmitted (e.g., from the app of the players mobile device or a gaming device at a bricks and mortar casino) in association with such a code or credentials to an online tournament server (in the case of games played online via a mobile device) or a casino tournament server (in the case of games played in a brick and mortar casino), such that the game play results may be property tracked for the appropriate tournament. In other embodiments, the game play results may be transmitted along with a player identifier, which in turn is associated with a particular tournament in a memory of a server device (e.g., the online tournament server 260*a* and/or the casino tournament server 260*b* of FIG. 2 herein) and thus the game play results may be tracked for the appropriate tournament based on the player identifier. The method 700 is one example process for how a casino tournament server or another device may collect and reconcile all game play results of participating players in order to determine the winner(s) of such a combined and/or hybrid online and in-casino tournament.

According to some embodiments, the method 700 may comprise initiating and/or opening a tournament, at 702. Once all players have been registered (e.g., up to a maximum quota of players) and/or once the appointed tournament start time (e.g., an actual time or another triggering event such as an environmental condition or occurrence of another unpredictable event) has occurred, for example, a tournament management system may open the tournament for play. In some embodiments, once the tournament has been started, the method 700 may comprise identifying whether there are any online participants, at 704. The tournament system may poll connected mobile gaming devices, sites (e.g., websites, virtual game rooms), and/or online systems, for example, to determine whether there are any current or past (e.g., completed) gaming sessions involving online (e.g., virtual and/or mobile) tournament participants. According to some embodiments, the tournament system may be notified (e.g., by the player and/or by the gaming device they are utilizing) upon initiation, completion, and/or intermediate events associated with the players tournament-based online game play.

In some embodiments, such as in the case that at least one online participant is identified, the method 700 may comprise retrieving game play results for the at least one online tournament participants, at 706. The tournament server or system may retrieve the results from a database, e.g., based on the identified at least one online players identifier (e.g., player number, account number, etc.) for example. In the case that no online tournament participants are identified, the method 700 may comprise identifying whether there are any in-casino participants, at 708. The tournament system may poll connected gaming devices and/or systems of one or more associated casinos, for example, to determine whether there are any current or past (e.g., completed) gaming sessions involving in-casino tournament participants. According to some embodiments, the tournament system may be notified (e.g., by the player and/or by the casino they are in) upon initiation, completion, and/or intermediate events associated with the player's tournament-based in-casino game play.

According to some embodiments, such as in the case that at least one in-casino participant is identified, the method 700 may comprise retrieving game play results for the at least one in-casino tournament participants, at 710. The tournament server or system may retrieve the results from a database, e.g., based on the identified at least one in-casino player's identifier (e.g., player number, account number, etc.) for example. In the case that no in-casino tournament participants are identified, the method 700 may comprise generating a leader board, at 712. The tournament system may score, sort, rank, filter, categorize, and/or group any and all retrieved data descriptive of the online and in-casino tournament participants, for example, to define one or more reports, interface screens, images, icons, badges, avatars, and/or other graphical/image elements for output via an electronic display device. In some embodiments, the leader board and/or the underlying processed information thereof may be transmitted to one or more remote gaming devices so that it may be displayed to the tournament participants. According to some embodiments, the leader board and/or leader board data may be transmitted to any gaming device at (or via) which any participant is currently active. In the case that an online participant is current playing a mobile wagering game (in an approved jurisdiction, for example) via a mobile user device, for example, the tournament system may send information and/or commands that cause the mobile device to output and indication of the leader board. In the case that an in-casino participant is current playing a physical poker card game at a poker card table in a casino, the tournament system may transmit data and/or commands that cause a display (e.g., a trend display) to output an indication of the leader board. According to some embodiments, the leader board may comprise any desired subset of data descriptive of the various players in the tournament such as the top five (5) players (e.g., at the current time), top fifty (50) players, or simply just the current standing, score, etc. for a single or particular player (e.g., whether online or in-casino).

In some embodiments, the method 700 may comprise determining whether there are more results to record and/or analyze, at 714. In the case that the tournament remains open, for example, the method 700 may automatically determine that more results exist, are likely, and/or may actively search or listen for additional results by returning to 704 (and/or 708). In the case that the tournament time window has expired (or a different triggering end event has occurred), for example, it may be determined that no more results qualify and the method 700 may accordingly proceed to close the tournament, at 716. In some embodiments, once closed, no player attempting to play a game session as part of the tournament will be authenticated as a tournament participant and that player's game play data may accordingly not be recorded, monitored, and/or may be discarded.

According to some embodiments, the system may not affirmatively close the tournament but may instead check to see whether the tournament remains open (e.g., in the case that it automatically closes or ends), at 716. For example, it may be determined that the current time is the end time for the tournament or that the last expected game result for the tournament has been received. In some embodiments, the retrieving of the game results at 706, 710 may occur after the close of the tournament (e.g., also or alternatively). The results of all game plays of all players who had participated in the tournament while it was open via online game play may be retrieved (e.g., from the online tournament server 260*a* of FIG. 2 herein) and/or the results of all game plays of all players who had participated in the tournament while it was open via game plays at physical gaming devices in brick and mortar casinos (e.g., in-casino) may be retrieved (e.g., from the casino tournament server 260*b* of FIG. 2 herein). As described herein, game play results for a player participating in a tournament, whether by playing online via an app on the players mobile device or at a gaming device in a brick and mortar casino, may be transmitted to an online tournament server and/or a casino tournament server if the system recognizes that the player is a registered participant for a tournament. These game play results may be stored in a database or other memory storage means, in association with the tournament identifier or in association with another tag or data that allows them to subsequently be retrieved for assessing the winner(s) of the tournament.

In some embodiments, the combined results (from 706 and 710) may then be processed in accordance with the method 700 to compute, calculate, and/or identify the winner(s) of the tournament, at 718. Thus, the game play results from both online and offline (e.g., physical or in-casino) game plays are utilized to determine the winner(s) of the tournaments and players were able to participate in the tournament by playing some game plays online and some at the casino and the players participating in the tournament did not need to be playing at the same time so long as they completed the game plays between the start time and end time of the tournament.

It should be noted that although the method 700 is described as determining the winner(s) of the tournament upon it being determined that the tournament has ended (e.g., the end time of the tournament has been reached), in other embodiments the tournament results may be updated and tracked in real time as the tournament progresses and game results for the tournament are received. Thus, for example, the casino tournament server or another device tasked with managing a tournament in which players can participate in the tournament asynchronously by playing some game plays online and some in brick and mortar casino locations may continuously or periodically update the tournament result (e.g., the leader board for the tournament that may be output to players via an app on the player's mobile device, available online via a website and/or available on display devices or gaming devices in a casino participating in the tournament), as game results from participating players are received for the tournament (e.g., at 712). According to some embodiments, the method 700 may comprise outputting the tournament results, at 720. The results may be output via the leader board, for example, and/or may otherwise be transmitted to a gaming device, mobile user device, server, display screen, etc., e.g., associated with each of the participants of the tournament. According to some embodiments, the outputting may comprise providing and/or generating a voucher, card, token, and/or other indication of a prize (such as a code) that may be redeemed, e.g., at a particular location (e.g., at a casino involved with the tournament, a particular store, restaurant, etc.).

V. Online and In-Casino Wagering Game Tournament Apparatus & Articles of Manufacture Turning to FIG. 8, a block diagram of an apparatus 810 according to some embodiments is shown. In some embodiments, the apparatus 810 may be similar in configuration and/or functionality to one or more of the player devices/mobile user devices/player stations 102*a-n*, 202, 404*x-z*, physical wagering game devices/gaming devices/apparatus/game tables 110, 210, 310, 410, 510, and/or the tournament controller/server devices 260*a*, 260*b*, 360, 560 of FIG. 1, FIG. 3, FIG. 4, and/or FIG. 5 herein. The apparatus 810 may, for example, execute, process, facilitate, and/or otherwise be associated with the methods 600, 700 of FIG. 6 and/or FIG. 7 herein, and/or portions and/or combinations thereof. In some embodiments, the apparatus 810 may comprise a processing device 812, an input device 814, an output device 816, a communication device 818, an interface 820, a memory device 840 (storing various programs and/or instructions 842 and data 844), and/or a cooling device 850. According to some embodiments, any or all of the components 812, 814, 816, 818, 820, 840, 842, 844, 850 of the apparatus 810 may be similar in configuration and/or functionality to any similarly named and/or numbered components described herein. Fewer or more components 812, 814, 816, 818, 820, 840, 842, 844, 850 and/or various configurations of the components 812, 814, 816, 818, 820, 840, 842, 844, 850 may be included in the apparatus 810 without deviating from the scope of embodiments described herein.

According to some embodiments, the processor 812 may be or include any type, quantity, and/or configuration of processor that is or becomes known. The processor 812 may comprise, for example, an Intel® IXP 2800 network processor or an Intel® XEON™ Processor coupled with an Intel® E7501 chipset. In some embodiments, the processor 812 may comprise multiple inter-connected processors, microprocessors, and/or micro-engines. According to some embodiments, the processor 812 (and/or the apparatus 810 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 810 comprises a server, such as a blade server or tournament management device, necessary power may be supplied via a standard AC outlet, power strip, surge protector, and/or Uninterruptible Power Supply (UPS) device.

In some embodiments, the input device 814 and/or the output device 816 are communicatively coupled to the processor 812 (e.g., via wired and/or wireless connections and/or pathways) and they may generally comprise any types or configurations of input and output components and/or devices that are or become known, respectively. The input device 814 may comprise, for example, a keyboard that allows an operator of the apparatus 810 to interface with the apparatus 810 (e.g., by a programmer to establish tournament rules and/or parameters). The output device 816 may, according to some embodiments, comprise a display screen and/or other practicable output component and/or device. The output device 816 may, for example, provide an interface (such as the interface 820) via which functionality for a combined and/or hybrid online and in-casino tournament is provided to a user (e.g., via a website, mobile application, and/or physical wagering game machines). According to some embodiments, the input device 814 and/or the output device 816 may comprise and/or be embodied in a single device, such as a touch-screen monitor.

In some embodiments, the communication device 818 may comprise any type or configuration of communication device that is or becomes known or practicable. The communication device 818 may, for example, comprise a Network Interface Card (NIC), a telephonic device, a cellular network device, a router, a hub, a modem, and/or a communications port or cable. In some embodiments, the communication device 818 may be coupled to receive tournament participation data and/or forward such data to one or more other (e.g., remote) devices (not shown in FIG. 8). According to some embodiments, the communication device 818 may also or alternatively be coupled to the processor 812. In some embodiments, the communication device 818 may comprise an IR, RF, Bluetooth®, NFC, and/or Wi-Fi® network device coupled to facilitate communications between the processor 812 and another device (such as a remote user device or gaming device, not separately shown in FIG. 8).

The memory device 840 may comprise any appropriate information storage device that is or becomes known or available, including, but not limited to, units and/or combinations of magnetic storage devices (e.g., a hard disk drive), optical storage devices, and/or semiconductor memory devices such as RAM devices, ROM devices, Single Data Rate Random Access Memory (SDR-RAM), Double Data Rate Random Access Memory (DDR-RAM), and/or Programmable Read Only Memory (PROM). The memory device 840 may, according to some embodiments, store one or more of tournament instructions 842-1, leader board instructions 842-2, interface instructions 842-3, tournament data 844-1, online player data 844-2, in-casino player data 844-3, and/or game data 844-4. In some embodiments, the tournament instructions 842-1, leader board instructions 842-2, interface instructions 842-3, tournament data 844-1, online player data 844-2, in-casino player data 844-3, and/or game data 844-4 may be utilized by the processor 812 to provide output information via the output device 816 and/or the communication device 818.

According to some embodiments, the tournament instructions 842-1 may be operable to cause the processor 812 to process the tournament data 844-1, online player data 844-2, in-casino player data 844-3, and/or game data 844-4 in accordance with embodiments as described herein. Tournament data 844-1, online player data 844-2, in-casino player data 844-3, and/or game data 844-4 received via the input device 814 and/or the communication device 818 may, for example, be analyzed, sorted, filtered, decoded, decompressed, ranked, scored, plotted, and/or otherwise processed by the processor 812 in accordance with the tournament instructions 842-1. In some embodiments, tournament data 844-1, online player data 844-2, in-casino player data 844-3, and/or game data 844-4 may be fed by the processor 812 through one or more mathematical, compiling, compression, encoding, AI logic (e.g., neural network), and/or statistical formulas and/or models in accordance with the tournament instructions 842-1 to create, define, initiate, run, manage, and/or facilitate one or more combined and/or hybrid online and in-casino wagering game tournaments, as described herein.

In some embodiments, the leader board instructions 842-2 may be operable to cause the processor 812 to process the tournament data 844-1, online player data 844-2, in-casino player data 844-3, and/or game data 844-4 in accordance with embodiments as described herein. Tournament data 844-1, online player data 844-2, in-casino player data 844-3, and/or game data 844-4 received via the input device 814 and/or the communication device 818 may, for example, be analyzed, sorted, filtered, decoded, decompressed, ranked, scored, plotted, and/or otherwise processed by the processor 812 in accordance with the leader board instructions 842-2. In some embodiments, tournament data 844-1, online player data 844-2, in-casino player data 844-3, and/or game data 844-4 may be fed by the processor 812 through one or more mathematical, compiling, compression, encoding, AI logic (e.g., neural network), and/or statistical formulas and/or models in accordance with the leader board instructions 842-2 to create, define, generate, provide, and/or output a leader board for one or more combined and/or hybrid online and in-casino wagering game tournaments, as described herein.

According to some embodiments, the interface instructions 842-3 may be operable to cause the processor 812 to process the tournament data 844-1, online player data 844-2, in-casino player data 844-3, and/or game data 844-4 in accordance with embodiments as described herein. Tournament data 844-1, online player data 844-2, in-casino player data 844-3, and/or game data 844-4 received via the input device 814 and/or the communication device 818 may, for example, be analyzed, sorted, filtered, decoded, decompressed, ranked, scored, plotted, and/or otherwise processed by the processor 812 in accordance with the interface instructions 842-3. In some embodiments, tournament data 844-1, online player data 844-2, in-casino player data 844-3, and/or game data 844-4 may be fed by the processor 812 through one or more mathematical, compiling, compression, encoding, AI logic (e.g., neural network), and/or statistical formulas and/or models in accordance with the interface instructions 842-3 to create, define, generate, provide, and/or output one or more interfaces for one or more combined and/or hybrid online and in-casino wagering game tournaments, as described herein.

According to some embodiments, the apparatus 810 may comprise the cooling device 850. According to some embodiments, the cooling device 850 may be coupled (physically, thermally, and/or electrically) to the processor 812 and/or to the memory device 840. The cooling device 850 may, for example, comprise a fan, heat sink, heat pipe, radiator, cold plate, and/or other cooling component or device or combinations thereof, configured to remove heat from portions or components of the apparatus 810.

Any or all of the exemplary instructions and data types described herein and other practicable types of data may be stored in any number, type, and/or configuration of memory devices that is or becomes known. The memory device 840 may, for example, comprise one or more data tables or files, databases, table spaces, registers, and/or other storage structures. In some embodiments, multiple databases and/or storage structures (and/or multiple memory devices 840) may be utilized to store information associated with the apparatus 810. According to some embodiments, the memory device 840 may be incorporated into and/or otherwise coupled to the apparatus 810 (e.g., as shown) or may simply be accessible to the apparatus 810 (e.g., externally located and/or situated).

Referring to FIG. 9A, FIG. 9B, FIG. 9C, FIG. 9D, and FIG. 9E, perspective diagrams of exemplary data storage devices 940*a-e* according to some embodiments are shown. The data storage devices 940*a-e* may, for example, be utilized to store instructions and/or data such as the tournament instructions 842-1, leader board instructions 842-2, interface instructions 842-3, tournament data 844-1, online player data 844-2, in-casino player data 844-3, and/or game data 844-4, each of which is presented in reference to FIG. 8 herein. In some embodiments, instructions stored on the data storage devices 940*a-e* may, when executed by a processor, cause the implementation of and/or facilitate the methods 600, 700 of FIG. 6 and/or FIG. 7 herein, and/or portions and/or combinations thereof.

According to some embodiments, the first data storage device 940*a* may comprise one or more various types of internal and/or external hard drives. The first data storage device 940*a* may, for example, comprise a data storage medium 946 that is read, interrogated, and/or otherwise communicatively coupled to and/or via a disk reading device 948. In some embodiments, the first data storage device 940*a* and/or the data storage medium 946 may be configured to store information utilizing one or more magnetic, inductive, and/or optical means (e.g., magnetic, inductive, and/or optical-encoding). The data storage medium 946, depicted as a first data storage medium 946*a* for example (e.g., breakout cross-section "A"), may comprise one or more of a polymer layer 946*a*-1, a magnetic data storage layer 946*a*-2, a non-magnetic layer 946*a*-3, a magnetic base layer 946*a*-4, a contact layer 946*a*-5, and/or a substrate layer 946*a*-6. According to some embodiments, a magnetic read head 948*a* may be coupled and/or disposed to read data from the magnetic data storage layer 946*a*-2.

In some embodiments, the data storage medium 946, depicted as a second data storage medium 946*b* for example (e.g., breakout cross-section "B"), may comprise a plurality of data points 946*b*-2 disposed with the second data storage medium 946*b*. The data points 946*b*-2 may, in some embodiments, be read and/or otherwise interfaced with via a laser-enabled read head 948*b* disposed and/or coupled to direct a laser beam through the second data storage medium 946*b*.

In some embodiments, the second data storage device 940*b* may comprise a CD, CD-ROM, DVD, Blu-Ray™ Disc, and/or other type of optically-encoded disk and/or other storage medium that is or becomes know or practicable. In some embodiments, the third data storage device 940*c* may comprise a USB keyfob, dongle, and/or other type of flash memory data storage device that is or becomes know or practicable. In some embodiments, the fourth data storage device 940*d* may comprise RAM of any type, quantity, and/or configuration that is or becomes practicable and/or desirable. In some embodiments, the fourth data storage device 940*d* may comprise an off-chip cache such as a Level 2 (L2) cache memory device. According to some embodiments, the fifth data storage device 940*e* may comprise an on-chip memory device such as a Level 1 (L1) cache memory device.

The data storage devices 940*a-e* may generally store program instructions, code, and/or modules that, when executed by a processing device cause a particular machine to function in accordance with one or more embodiments described herein. The data storage devices 940*a-e* depicted in FIG. 9A, FIG. 9B, FIG. 9C, FIG. 9D, and FIG. 9E are representative of a class and/or subset of computer-readable media that are defined herein as "computer-readable memory" (e.g., non-transitory memory devices as opposed to transmission devices or media)

What is claimed is:

1. A method for conducting a hybrid online and in-casino wagering game tournament, comprising:

receiving, at an electronic table game in a casino, a tournament entry token from a first player of a first player position;

automatically detecting, by a sensor of the electronic table game, the tournament entry token;

identifying, by the electronic table game, a wagering game tournament indicated by the tournament entry token;

conducting, by the electronic table game, a first gaming session of a first wagering game;

transmitting, by the electronic table game and to a tournament management server, data descriptive of the participation of the first player in the first gaming session of the first wagering game;

receiving, by an online game server, and from the first player, an indication of the wagering game tournament for which the first player is a participant;

conducting, by the online game server, a second gaming session of a second wagering game;

combining, by the tournament management server, the results of the first player in each of the first and second gaming sessions; and computing, by the tournament management server and based at least in part on the combined results of the first player, an outcome for the wagering game tournament for which the first player is a participant.

2. The method of claim 1, wherein the online game server and the tournament management server are the same.

3. The method of claim 1, further comprising:

providing, in response to the computing, a prize to the first player.

4. The method of claim 3, wherein the prize is provided to the first player in the casino.

5. The method of claim 1, wherein the indication of the wagering game tournament received by the online game server comprises a code.

6. The method of claim 1, wherein the combining, comprises:

adding scores achieved by the first player in each of the first and second gaming sessions.

7. The method of claim 1, wherein the computing comprises:

ranking a numeric value from the combined results of the first and second gaming sessions of the first player against numeric result values achieved by at least one other player in the wagering game tournament.

8. A method for conducting a combined online and in-casino wagering game tournament, comprising:

receiving, at an electronic table game in a casino, a tournament entry token from a first player of a first player position;

automatically detecting, by a sensor of the electronic table game, the tournament entry token;

identifying, by the electronic table game, a wagering game tournament indicated by the tournament entry token;

conducting, by the electronic table game, a first gaming session of a first wagering game;

transmitting, by the electronic table game and to a tournament management server, data descriptive of the participation of the first player in the first gaming session of the first wagering game;

receiving, by an online game server, and from a second player, an indication of the wagering game tournament for which the second player is a participant;

conducting, by the online game server, a second gaming session of a second wagering game;

retrieving, by the tournament management server, the results of the first player and the second player in the respective first and second gaming sessions; and computing, based at least in part on the retrieved results of the first player and the second player, an outcome for the wagering game tournament.

9. The method of claim 8, wherein the online game server and the tournament management server are the same.

10. The method of claim 8, further comprising:

providing, in response to the computing, a prize to at least one of the first player and the second player.

11. The method of claim 10, wherein the prize is provided to the at least one of the first player and the second player in the casino.

12. The method of claim 8, wherein the indication of the wagering game tournament received by the online game server comprises a code.

13. The method of claim 8, wherein the computing comprises:

ranking a first numeric value descriptive of the results of the first player in the first gaming session against a second numeric value descriptive of the results of the second player in the second gaming session.

14. A method for conducting a gaming session of a wagering game at an electronic table game in a casino in coordination with a combined online and in-casino wagering game tournament, comprising:

identifying, by the electronic table game, a plurality of players at a plurality of respective player positions of the wagering game;

automatically detecting, by a sensor of the electronic table game and with respect to a first player from the plurality of players, a tournament entry token;

identifying, by the electronic table game, a wagering game tournament indicated by the tournament entry token;

receiving, from each player of the plurality of players, at least one wager for the gaming session of the wagering game, thereby defining a plurality of wagers;

identifying, by the electronic table game and as part of the gaming session of the wagering game, a random gaming session input;

computing, by the electronic table game and as part of the gaming session of the wagering game, and utilizing the random gaming session input, a gaming session outcome;

computing, by the electronic table game and utilizing the gaming session outcome, a gaming session result; and transmitting, by the electronic table game and to a tournament server, data descriptive of the participation of the first player in the gaming session.

15. The method of claim 14, wherein data descriptive of the participation of the other players from the plurality of players in the gaming session is not transmitted to the tournament server.

16. The method of claim 14, where the computing of the gaming session outcome, comprises:

identifying at least one outcome rule for the gaming session; and applying the at least one outcome rule to the random gaming session input.

17. The method of claim 16, wherein the computing of the gaming session outcome, further comprises:

identifying a rule for the wagering game tournament; and modifying the gaming session outcome by applying the rule for the wagering game tournament.

18. The method of claim 16 where the computing of the gaming session result, comprises:

identifying a set of result rules for the gaming session; and applying, for each player of the plurality of players, the set of result rules to the gaming session outcome, thereby defining a gaming session result for each player.

19. The method of claim 18, wherein the computing of the gaming session results, further comprises:

identifying a rule for the wagering game tournament; and modifying a first gaming session result for the first player by applying the rule for the wagering game tournament.

20. The method of claim 16 where the computing of the gaming session result, comprises:

identifying a set of result rules for the gaming session;

identifying a rule for the wagering game tournament;

applying, for each of the other players of the plurality of players, the set of result rules to the gaming session outcome, thereby defining a gaming session result for each of the other players; and applying, for the first player, the rule for the wagering game tournament to the gaming session outcome, thereby defining a first gaming session result for the first players.

* * * * *